(12) United States Patent
Ishibe

(10) Patent No.: US 7,145,591 B2
(45) Date of Patent: Dec. 5, 2006

(54) MULTI-BEAM OPTICAL SCANNING DEVICE

(75) Inventor: Yoshihiro Ishibe, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 366 days.

(21) Appl. No.: 10/802,856

(22) Filed: Mar. 18, 2004

(65) Prior Publication Data

US 2004/0189789 A1 Sep. 30, 2004

(30) Foreign Application Priority Data

Mar. 31, 2003 (JP) ............................. 2003-094173

(51) Int. Cl.
*B41J 27/00* (2006.01)
(52) U.S. Cl. ...................................... 347/244; 347/258
(58) Field of Classification Search ................ 347/134, 347/230–231, 241–244, 250, 256–261; 359/204–207, 359/216–219
See application file for complete search history.

(56) References Cited

U.S. PATENT DOCUMENTS

| | | | | |
|---|---|---|---|---|
| 5,859,720 A | 1/1999 | Ishibe | ........................ | 359/196 |
| 5,995,131 A | 11/1999 | Fujibayashi et al. | ......... | 347/258 |
| 6,067,106 A | 5/2000 | Ishibe et al. | ................. | 347/258 |
| 6,133,935 A | 10/2000 | Fujibayashi et al. | ........ | 347/258 |
| 6,256,132 B1 | 7/2001 | Ishibe | ........................ | 359/204 |
| 6,317,244 B1 | 11/2001 | Ishibe | ........................ | 359/204 |
| 6,362,470 B1 | 3/2002 | Yoshida et al. | ............. | 250/235 |
| 6,643,043 B1 * | 11/2003 | Kato | ........................... | 359/206 |
| 7,015,940 B1 * | 3/2006 | Kimura | ....................... | 347/250 |
| 2002/0063910 A1 | 5/2002 | Ishibe | ........................ | 358/514 |
| 2002/0163703 A1 | 11/2002 | Ishibe | ........................ | 359/204 |
| 2003/0001944 A1 | 1/2003 | Yoshida et al. | ............. | 347/241 |

FOREIGN PATENT DOCUMENTS

| | | | |
|---|---|---|---|
| EP | 1122579 A2 * | 8/2001 | |
| JP | 5-333281 | 12/1993 | |
| JP | 9-197308 | 7/1997 | |

\* cited by examiner

*Primary Examiner*—Hai Pham
(74) *Attorney, Agent, or Firm*—Fitzpatrick, Cella, Harper & Scinto

(57) ABSTRACT

It is an object of the present invention to realize a multi-beam optical scanning device which is suitable for high speed and high recording density by almost completely offsetting and correcting a deviation of focusing positions in a main scanning direction of plural spots in an entire surface to be scanned without deteriorating focusing properties at all. The multi-beam optical scanning device includes: a light source device 1 having plural luminescence parts; a rotating polygon mirror 5; a first optical system 2 which converts plural light beams into convergent light beams or divergent light beams; and a third optical system 6 which guides the light beams onto a surface to be scanned 7 of a drum shape, and when it is assumed that a maximum value of a positional deviation amount generated in a first direction is $\delta Y1$, a maximum value of a positional deviation amount generated in a second direction is $\delta Y2$, and a maximum value of a positional deviation amount generated in a third direction is $\delta Y3$, conditional expression (1) is satisfied.

5 Claims, 23 Drawing Sheets

MULTI-BEAM OPTICAL SCANNING DEVICE

BACKGROUND OF THE INVENTION

1. Field of the Invention

The present invention relates to a multi-beam optical scanning device, and in particular to a multi-beam optical scanning device which is adapted to perform image formation using a multi-beam laser having plural luminescence parts (luminescence points) as light source means in order to attain high speed and high recording density and is preferable for image forming apparatuses such as laser beam printer, a digital copying machine, and a multi-function printer having an electrophotographic process.

2. Related Background Art

FIG. 27 is a sectional view of a principal part in a main-scanning direction of a conventional multi-beam optical scanning device using light source means having plural luminescence parts.

In the figure, plural light beams, which have been emitted from a multi-beam laser 91 having plural luminescence parts, are converted into substantially parallel light beams by a collimator lens. 92, converged only in a sub-scanning direction by a cylindrical lens 94 having a predetermined refractive power only in the sub-scanning direction, shaped by an aperture stop 93, and focused in a focal line shape extending in a main-scanning direction in the vicinity of a reflective surface (polygon surface) 95a of a rotating polygon mirror 95 serving as a light deflector. Then, the plural light beams, which have been reflected and deflected by the polygon mirror 95 rotating at a constant angular velocity in a direction of arrow 95b in the figure, are respectively condensed in a spot shape on a photosensitive drum surface 97, which serves as a surface to be scanned, by two fθ lens systems 96a and 96b serving as a scanning lens system 96. The light beams are used for scanning at a constant velocity in a direction of arrow 97b in the figure.

In such a multi-beam scanning optical system, if plural luminescence parts A and B are arranged vertically in one line in a sub-scanning direction as shown in FIG. 28, an interval of plural scanning lines in the sub-scanning direction on a photosensitive drum surface becomes much larger compared with recording density. Thus, usually, the plural luminescence parts A and B are arranged to be tilted in a direction corresponding to the sub-scanning direction as shown in FIG. 29. By adjusting a slope angle δ of the luminescence parts A and B, an interval of plural scanning lines in the sub-scanning direction on the photosensitive drum is adjusted accurately according to recording density.

In addition, if plural light beams made incident on a photosensitive drum surface return to a multi-beam laser due to regular reflection of the photosensitive drum surface, oscillation of the multi-beam laser becomes unstable. If the regular reflected light returns to an optical system, reflected light returns to the photosensitive drum surface due to surface reflection of the optical system to cause ghost. Thus, conventionally, as shown in FIG. 30, an angle in a sub-scanning direction formed by the plural light beams to be made incident on the photosensitive drum surface 97 and a normal line of the photosensitive drum surface 97 is set to be a predetermined angle (incident angle) β. Consequently, the regular reflected light on the photosensitive drum surface 97 does not return to the multi-beam laser and the optical system.

If such a structure is adopted in a multi-beam optical scanning device, as shown in FIG. 31, a scanning length of each of the plural scanning lines on the photosensitive drum surface 97 varies, and a deviation in a main-scanning direction is caused in focus positions of respective spots on the photosensitive drum surface 97. As a result, a high-quality image cannot be obtained.

There have been proposed various multi-beam optical scanning devices which solve this problem (e.g., see Japanese Patent Application Laid-Open Nos. H5-333281 and H9-197308). In Japanese Patent Application Laid-Open No. H5-333281, an angle formed by plural light beams in a sub-scanning direction and a normal line of a photosensitive drum surface is set to be equal to or smaller than a predetermined angle, whereby a positional deviation of focusing in the main-scanning direction is reduced. In Japanese Patent Application Laid-Open No. H9-197308, a positional deviation of focusing in a main-scanning direction is cancelled by decentering a focusing optical system and adjusting an amount of the decentering.

However, in the multi-beam optical scanning devices proposed in these laid-open patent applications, both a positional deviation of focusing in the main-scanning direction and a focusing property (spot shape) cannot be satisfied simultaneously.

For example, in Japanese Patent Application Laid-Open No. H5-333281, the positional deviation of focusing in the main-scanning direction is simply reduced and made less conspicuous by setting the angle formed by the plural light beams in the sub-scanning direction and the normal line on the photosensitive drum surface to be equal to or smaller than the predetermined angle. Japanese Patent Application Laid-Open No. H5-333281 does not disclose a fundamental solution against the positional deviation of focusing in the main-scanning direction at all.

In addition, in Japanese Patent Application Laid-Open No. H9-197308, the positional deviation of focusing in the main-scanning direction is cancelled by decentering the focusing optical system and adjusting an amount of decentering. However, if the focusing optical system is used in a decentered state, a focusing spot shape on the photosensitive drum surface tends to be deteriorated. Therefore, it is difficult to attain high image quality and high recording density.

SUMMARY OF THE INVENTION

It is an object of the present invention to provide a multi-beam optical scanning device which satisfies both a positional deviation of focusing in a main-scanning direction and a focusing property simultaneously and is optimal for high speed and a high image quality.

Further characteristics of the present invention will become apparent from the accompanying drawings and the following description.

DETAILED DESCRIPTION OF THE PREFERRED EMBODIMENTS

First Embodiment

Figure 1:
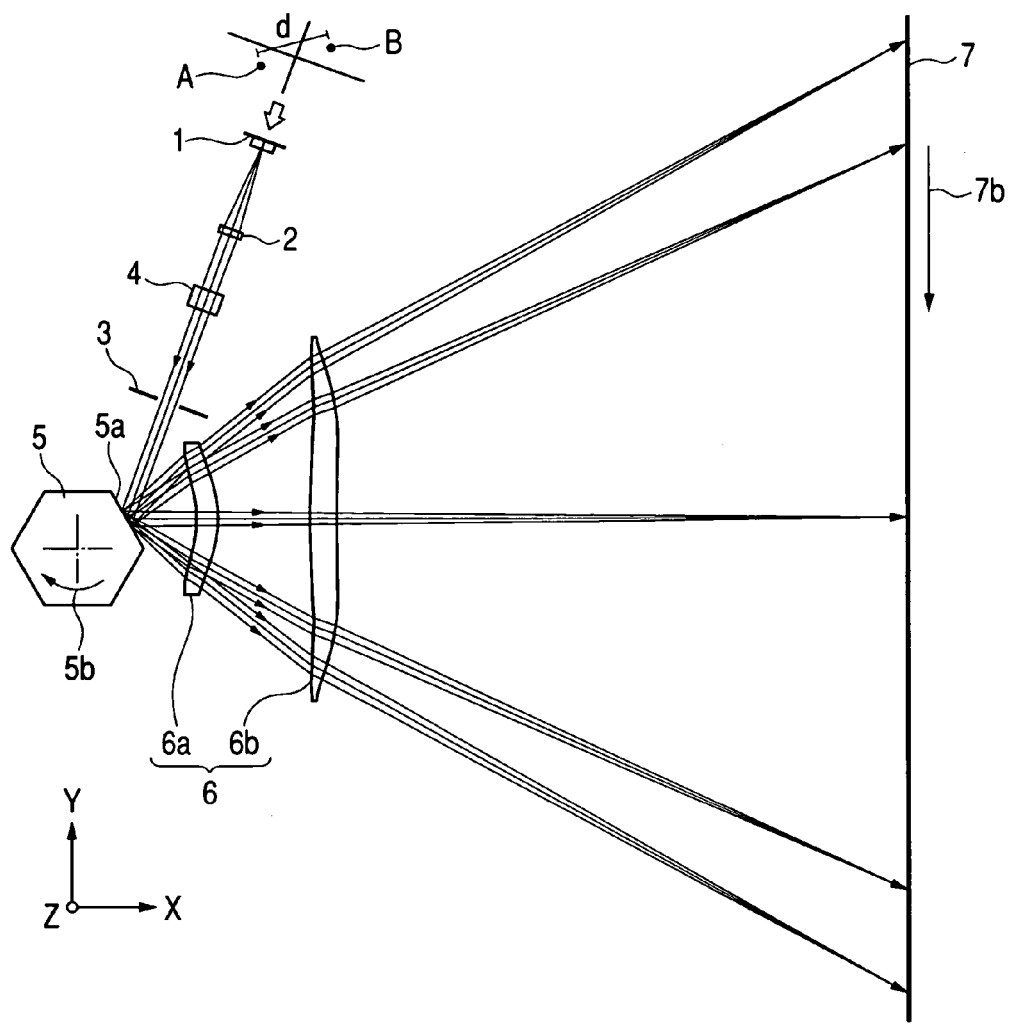
FIG. 1 is a main-scanning sectional view of a multi-beam optical scanning device of a first embodiment of the present invention.

FIG. 1 is a sectional view of a principal part in a main-scanning direction (main-scanning sectional view) of a first embodiment of the present invention.

Figure 2:
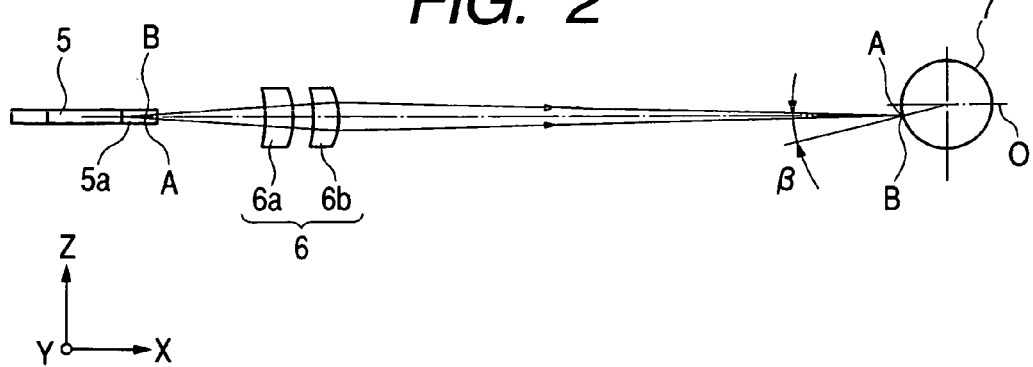
FIG. 2 is a sub-scanning sectional view of the multi-beam optical scanning device of the first embodiment of the present invention.

FIG. 2 is a sectional view of a principal part in a sub-scanning direction (sub-scanning sectional view) of FIG. 1.

Here, the main-scanning direction indicates a direction perpendicular to a rotation axis of a rotating polygon mirror and an optical axis of a scanning lens system (a direction in which light beams are reflected and deflected (deflected for scanning) by the rotating polygon mirror), and the sub-scanning direction indicates a direction parallel to the rotation axis of the rotating polygon mirror. In addition, a main-scanning section indicates a plane which is parallel to the main-scanning direction and includes the optical axis of the scanning lens system. A sub-scanning section indicates a section perpendicular to the main-scanning section.

In FIGS. 1 and 2, reference numeral 1 denotes light source means which consists of, for example, a multi-beam laser in which plural luminescence parts (luminescence points) A and B are arranged to be tilted by an arbitrary angle with respect to a direction corresponding to the sub-scanning direction.

Reference numeral 2 denotes a condensing lens (collimator lens) serving as a first optical system. The condensing lens 2 converts plural light beams emitted from the light source means 1 into convergent light beams (or divergent light beams).

Reference numeral 4 denotes a lens system (cylindrical lens) serving as a second optical system. The lens system 4 has a predetermined refractive power only in the sub-scanning direction and focuses plural light beams, which have passed through the condensing lens 2, on a reflection surface (polygon surface) 5a of a rotating polygon mirror 5, which will be described later, substantially as a linear image in the sub-scanning section.

Reference numeral 3 denotes an aperture stop, which limits a width of the plural light beams which have passed through the cylindrical lens 4.

Reference numeral 5 denotes a rotating polygon mirror which has reflection surfaces for deflecting plural light beams emitted from the plural luminescence parts A and B, respectively. The rotating polygon mirror 5 is rotated at a constant velocity in a direction of arrow 5b in the figure by drive means (not shown) such as a motor.

Reference numeral 6 denotes an fθ lens system (scanning lens system), which has an fθ property, serving as a third optical system. The fθ lens system 6 has first and second fθ lenses (scanning lenses) 6a and 6b. The fθ lens system 6 focuses the plural light beams, which have been deflected and reflected by the polygon mirror 5, on a surface to be scanned 7 and brings the reflection surface 5a of the polygon mirror 5 and the surface to be scanned 7 into substantially a conjugate relation in the sub-scanning section to thereby correct toppling of the reflection surface 5a.

Reference numeral 7 denotes a photosensitive drum surface (image bearing member surface) serving as a surface to be scanned. The photosensitive drum surface is formed in a shape of a drum having a rotation axis along the main-scanning direction.

In this embodiment, two light beams, which have been optically modulated according to image information and emitted from the multi-beam laser 1, are converted into convergent light beams by the condensing lens 2 and made incident on the cylindrical lens 4. In the main-scanning section, the light beams made incident on the cylindrical lens 4 exit the cylindrical lens 4 in an unchanged state and pass through the aperture stop 3 (partially shielded). In the sub-scanning section, the light beams converge and pass through the aperture stop 3 (partially shielded) and focus on the reflection surface 5a of the polygon mirror 5 substantially as a linear image (linear image longitudinal in the main-scanning direction). Then, the two light beams, which have been reflected and deflected on the reflection surface 5a of the polygon mirror 5, are guided onto the photosensitive drum surface 7 via the fθ lens system 6, respectively, and rotate the polygon mirror 5 in a direction of arrow 5b in the figure to thereby optically scan the photosensitive drum surface 7 in a direction of arrow 7b in the figure (main-scanning direction) at a uniform velocity. Consequently, two scanning lines are formed on the photosensitive drum surface 7 serving as a recording medium, and image recording is performed.

In this embodiment, in order to prevent regular reflected light reflected on the photosensitive drum surface 7 from returning to the optical system as described above, an angle in the sub-scanning direction formed by principal rays of two light beams to be made incident on the photosensitive drum surface 7 and the normal line of the photosensitive drum surface 7 are set to be a predetermined angle (incident angle) β as shown in FIG. 2.

In the case in which an angle in the sub-scanning direction formed by principal rays of two light beams to be made incident on the photosensitive drum surface 7 and the normal line of the photosensitive drum surface 7 are set to be the predetermined angle β, focusing positions of respective spots deviate in the main-scanning direction.

Here, a principle explaining how the focusing positions of the respective spots deviate in the main scanning direction will be described using FIG. 22. Note that, for ease of explanation, it is assumed that there are two luminescence parts.

Figure 22:
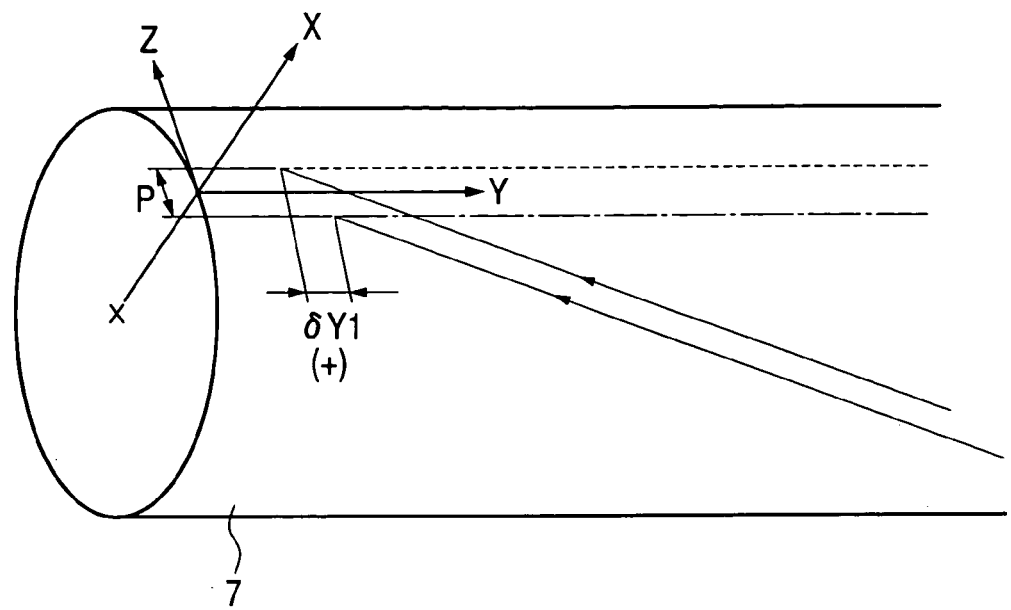
FIG. 22 is a diagram illustrating a positional deviation in a main-scanning direction of plural beams which are generated when a beam to be made, incident on a drum and a normal line of the drum have an angle in a sub-scanning direction.

FIG. 22 is a perspective view of a principal part representing a state in which two scanning lines are used for scanning the photosensitive drum surface 7 in a parallel manner. In the figure, orthogonal coordinates with the main-scanning direction assumed to be the Y axis, the sub-scanning direction, that is, a direction in which the photosensitive drum moves assumed to be the Z axis, and the normal line direction of the photosensitive drum surface 7 assumed to be the X axis will be considered.

As shown in the figure, it is assumed that an angle formed by principal rays of light beams to be made incident on the photosensitive drum surface 7 and an optical axis of the fθ lens system at the time of a maximum scanning angle of view is θ, and an angle formed by the XY plane and a plane formed by light beams to be made incident on the photosensitive drum surface 7 is β.

In this case, in the two scanning lines, an optical path length difference δL is caused in a traveling direction of the light beams. When it is assumed that an interval in the sub-scanning direction of the respective scanning lines, which scan the photosensitive drum surface 7 simultaneously, is P, the optical path length difference δL can be represented as follows:

$$\delta L = P \times \sin \beta$$

Moreover, since the optical path length difference δL in the traveling direction of the light beams is caused, a positional deviation is caused in the principal rays of the two light beams to be made incident on the photosensitive drum surface 7 in the main-scanning direction (Y direction). A positional deviation amount δY1 (maximum value) at an end in the Y direction of the figure can be represented as follows:

$$\delta Y1 = \delta L \times \tan \theta = P \times \sin \beta \times \tan \theta$$

In the figure, it is assumed that, when a direction of a positional deviation of a scanning line on a minus side (lower side) in the Z direction with respect to a scanning line on a plus side (upper side) in the Z direction is on a plus side in the Y direction, a sign of δY1 is +.

In this embodiment, an incident angle β in the sub-scanning direction formed by the respective light beams to be made incident on the photosensitive drum surface 7 and the normal line of the photosensitive drum surface 7, an angle θ formed by the principal rays of the light beams to be made incident on the photosensitive drum surface 7 and the normal line of the photosensitive drum surface 7 at the time of a maximum scanning angle of view in the main-scanning section, a degree of convergence of light beams to be made incident on the fθ lens system 6, and the like are set-such that, in the case in which the positional deviation amount δY1 is plus, a positional deviation amount δY2 in the main-scanning direction of focusing points of the respective light beams on the photosensitive drum surface 7, which is generated by converting the light beams made incident on the fθ lens system 6 into convergent light beams, is minus, and a positional deviation amount δY3 in the main-scanning direction among focusing points of the respective light beams on the photosensitive drum surface 7 due to magnification chromatic aberration, which is generated by a relative wavelength difference of the light beams emitted from the two luminescence parts A and B, is minus, and the positional deviation amount δY1 and an amount found by adding the positional deviation amount δY2 and the positional deviation amount δY3 are in directions in which the amounts are offset each other.

In addition, an incident angle β in the sub-scanning direction formed by the respective light beams to be made incident on the photosensitive drum surface 7 and the normal line of the photosensitive drum surface 7, an angle θ formed by the principal rays of the light beams to be made incident on the photosensitive drum surface 7 and the normal line of the photosensitive drum surface 7 at the time of a maximum scanning angle of view in the main-scanning section, a degree of convergence of light beams made incident on the fθ lens system 6, and the like are set such that, in the case in which the positional deviation amount δY1 is minus, the positional deviation amount δY2 is plus, and the positional deviation amount δY3 is plus, and the positional deviation amount δY1 and an amount found by adding the positional deviation amount δY2 and the positional deviation amount δY3 are in directions in which the amounts are offset each other.

A principle explaining how, in the case in which the respective light beams made incident on the fθ lens system 6 are convergent light beams, a positional deviation in the main-scanning direction is caused in the focusing points of the respective light beams on the photosensitive drum surface 7 will be hereinafter described with reference to the drawings. For simplicity, the description is made on the assumption that there are two luminescence parts.

Figure 29:
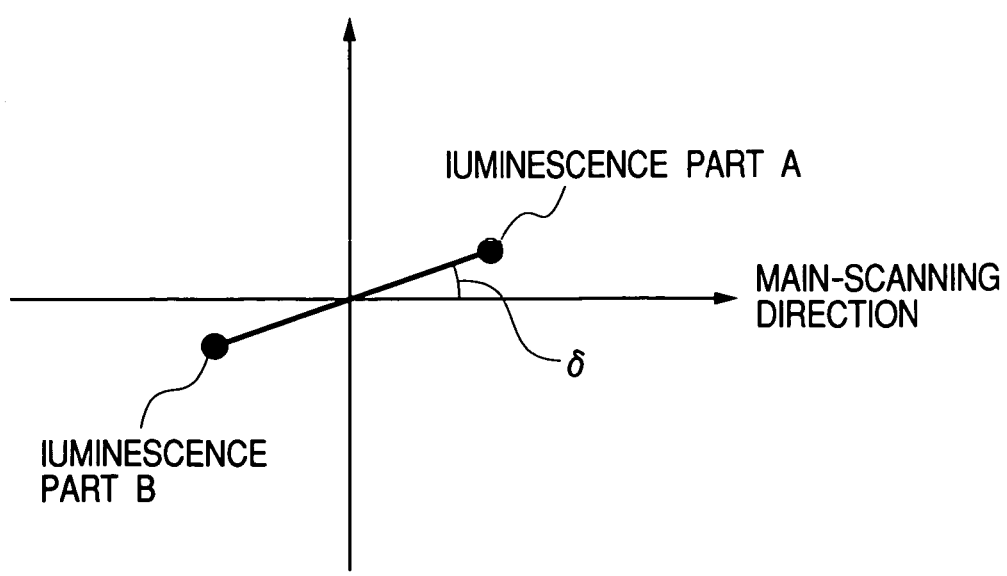
FIG. 29 is a diagram showing how luminescent points of the conventional multi-beam optical scanning device are arranged.
Figure 30:
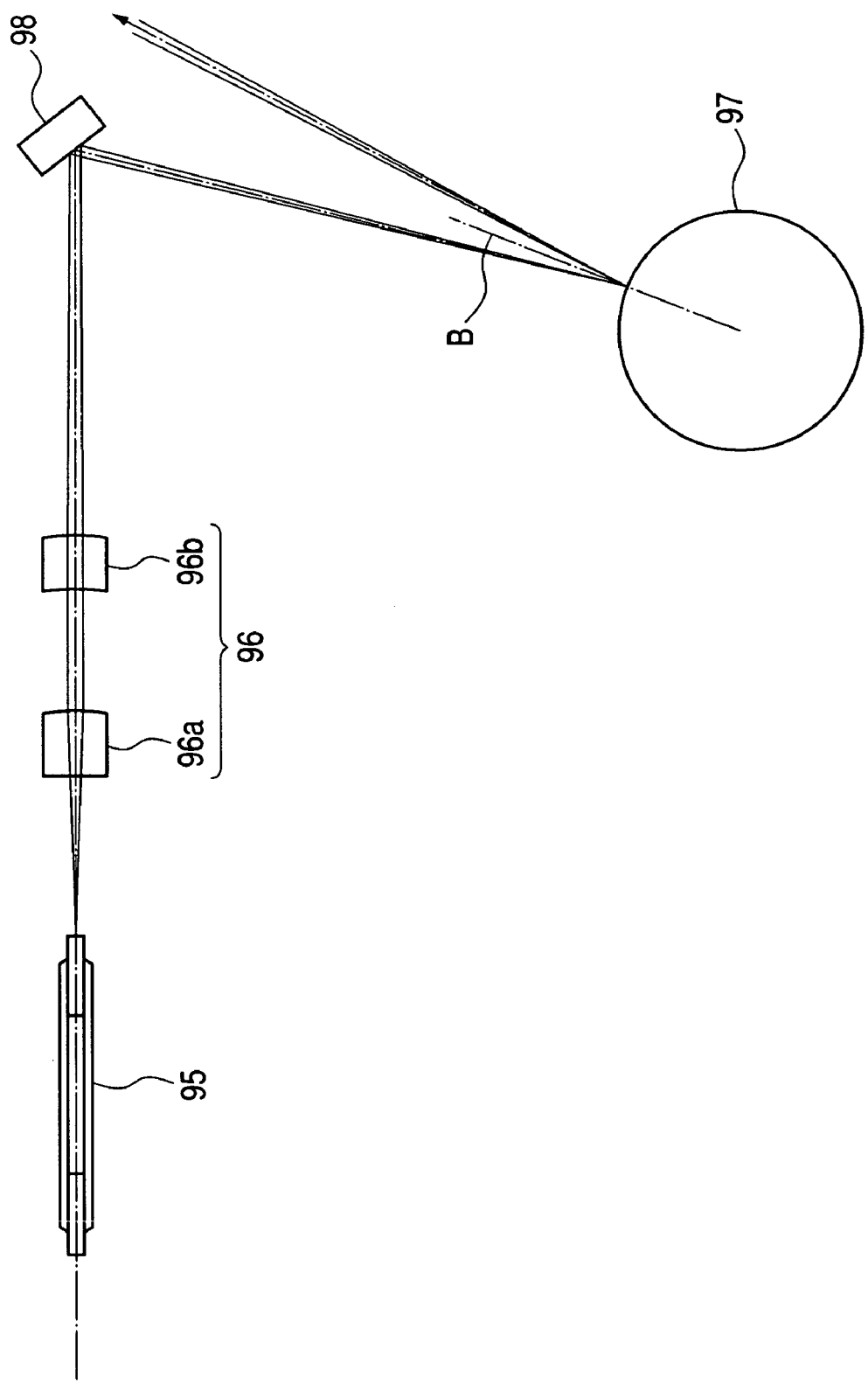
FIG. 30 is a diagram illustrating an arrangement in a sub-scanning direction of light beams to be made incident on a drum and a normal line of the drum of the conventional multi-beam optical scanning device.
Figure 31:
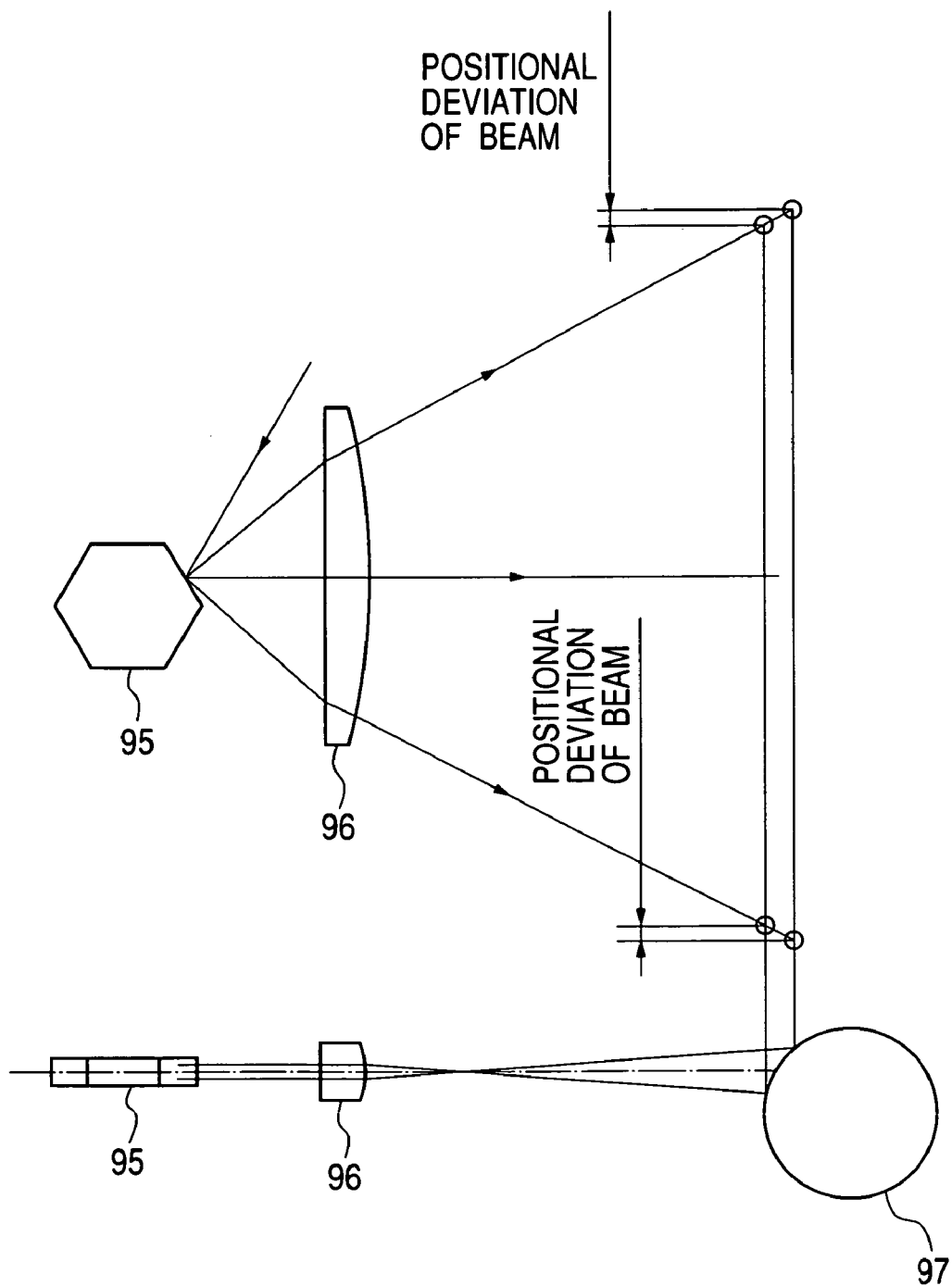
FIG. 31 is a diagram for explaining that lengths of respective scanning lines are different in the case in which light beams to be made incident on a drum and a normal line of the drum are arranged forming a predetermined angle in a sub-scanning direction.

As described above, in the multi-beam optical scanning device with the structure in which the two luminescence parts A and B are arranged to be titled with respect to the direction corresponding to the sub-scanning direction as shown in FIG. 29, since reflection angles after the two light beams are deflected and reflected by the polygon mirror 5 are different from each other, spots are focused in positions apart from each other in the main-scanning direction on the photosensitive drum surface 7. Thus, in the multi-beam optical scanning device with such a structure, image data is sent by staggering timing by a predetermined time δT such that a focusing position of a light beam emitted from one luminescence part is aligned with a position where a light beam emitted from the other luminescence part, which is a reference luminescence part, is focused on the photosensitive drum surface 7.

Figure 23:
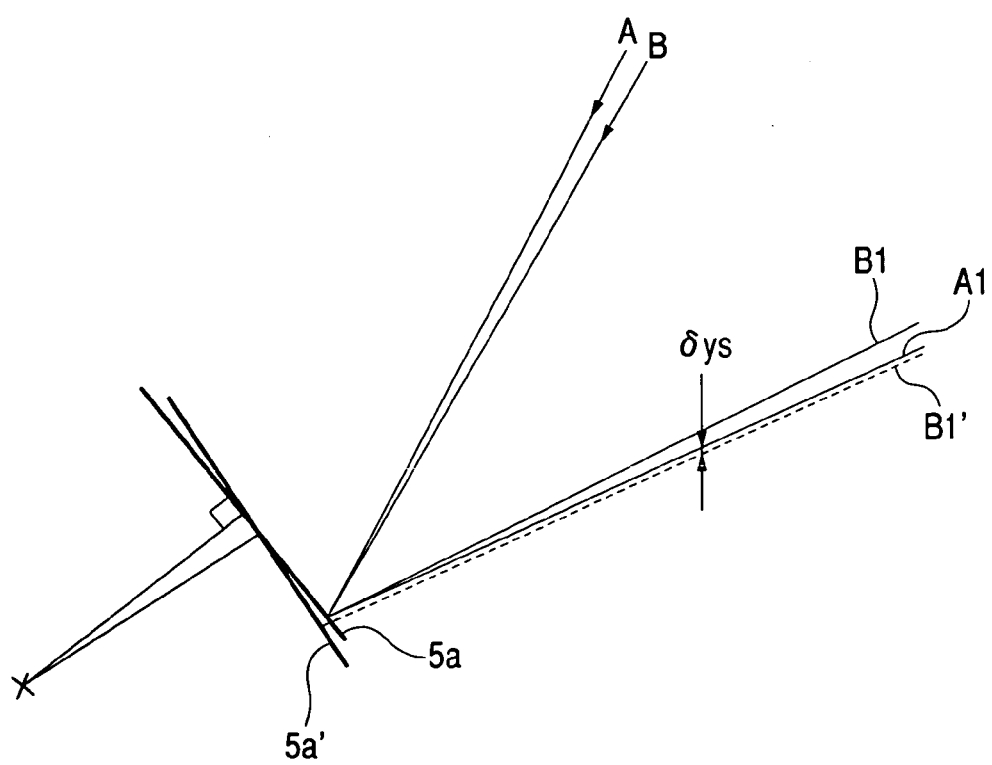
FIG. 23 is a diagram illustrating a state in which principal rays of plural light beams on a scanning start side are reflected by a polygon.

FIG. 23 shows this state. FIG. 23 is an explanatory diagram showing a state in which principal rays of two light beams on the scanning start side are reflected on the reflection surface (polygon surface) 5a of the polygon mirror 5.

In the figure, first, a light beam, which is emitted from the luminescence part A, is reflected on the reflection surface 5a of the polygon mirror 5 in a direction of A1 in the figure and focused on the photosensitive drum surface 7 by the fθ lens system (not shown) 6.

Next, a light beam, which is emitted from the luminescence part B at a time staggered by the predetermined time δT, is reflected by a reflection surface 5' in a direction of B1' in the figure, that is, the same direction as A1 in the figure, whereby focusing positions of spots of the respective light beams coincide with each other.

However, although the principal rays of the two light beams after being reflected by the polygon mirror 5 have the same incident angle on the fθ lens system 6, since a deviation is caused in the reflection positions of the principal rays of the respective light beams, the principal rays are made incident on the fθ lens system 6 deviating in the main-scanning direction by δys.

In the case in which the two light beams to be made incident on the fθ lens system 6 are substantially parallel rays, even if a deviation is caused in the principal rays of the respective light beams in the main-scanning direction by δys, focusing positions of spots on the photosensitive drum surface 7 are the same.

However, in the case in which the two light beams to be made incident on the fθ lens system 6 are convergent light beams, if a deviation is caused in the principal rays of the respective light beams in the main-scanning direction by δys, a deviation is also caused in focusing positions in the main-scanning direction of spots on the photosensitive drum surface 7.

Figure 25:
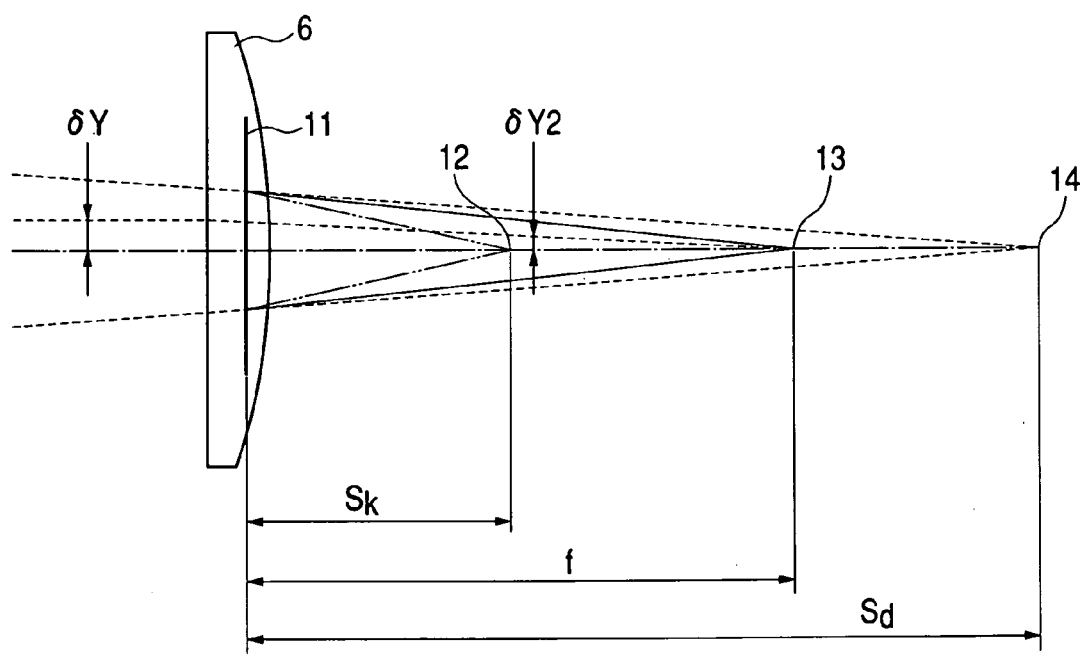
FIG. 25 is a diagram for explaining that respective spots causes a positional deviation in a main-scanning direction on a drum surface when plural convergent beams to be made incident on an fθ lens have a positional deviation in the main-scanning direction.

FIG. 25 is a schematic diagram of a principal part of an optical system for explaining this phenomenon. In the figure, reference numeral 6 denotes an fθ lens system. It is assumed that a distance from a light outgoing side principal plane 11 of the fθ lens system 6 to a natural convergent point 14 of the convergent light beams made incident on the fθ lens system 6 is Sd, a focal length of the fθ lens system 6 is f, and a distance from the light outgoing side principal plane 11 of the fθ lens system 6 to a position (i.e., a photosensitive drum surface) 12, in which the convergent light beams made incident on the fθ lens system 6 are converged and focused by the fθ lens system 6, is Sk.

Here, since

[Expression 1]
$$\frac{1}{Sk} = \frac{1}{Sd} + \frac{1}{f}$$

the focal length f is represented as follows:

[Expression 2]
$$f = \frac{Sd \times Sk}{Sd - Sk}$$

In addition, when it is assumed that a deviation amount in the main-scanning direction of the principal rays of the respective light beams emitted from the respective luminescence parts A and B is δy, and a deviation amount of the focusing positions of the spots in the main-scanning direction of the respective light beams emitted from the respective luminescence parts A and B on the photosensitive drum surface 7 is δY2 (maximum value), as it is evident from the figure, a deviation represented by the following expression is caused:

[Expression 3]
$$\delta Y2 = \frac{f - Sk}{f} \times \delta y = \frac{Sk}{Sd} \times \delta y$$

Figure 24:
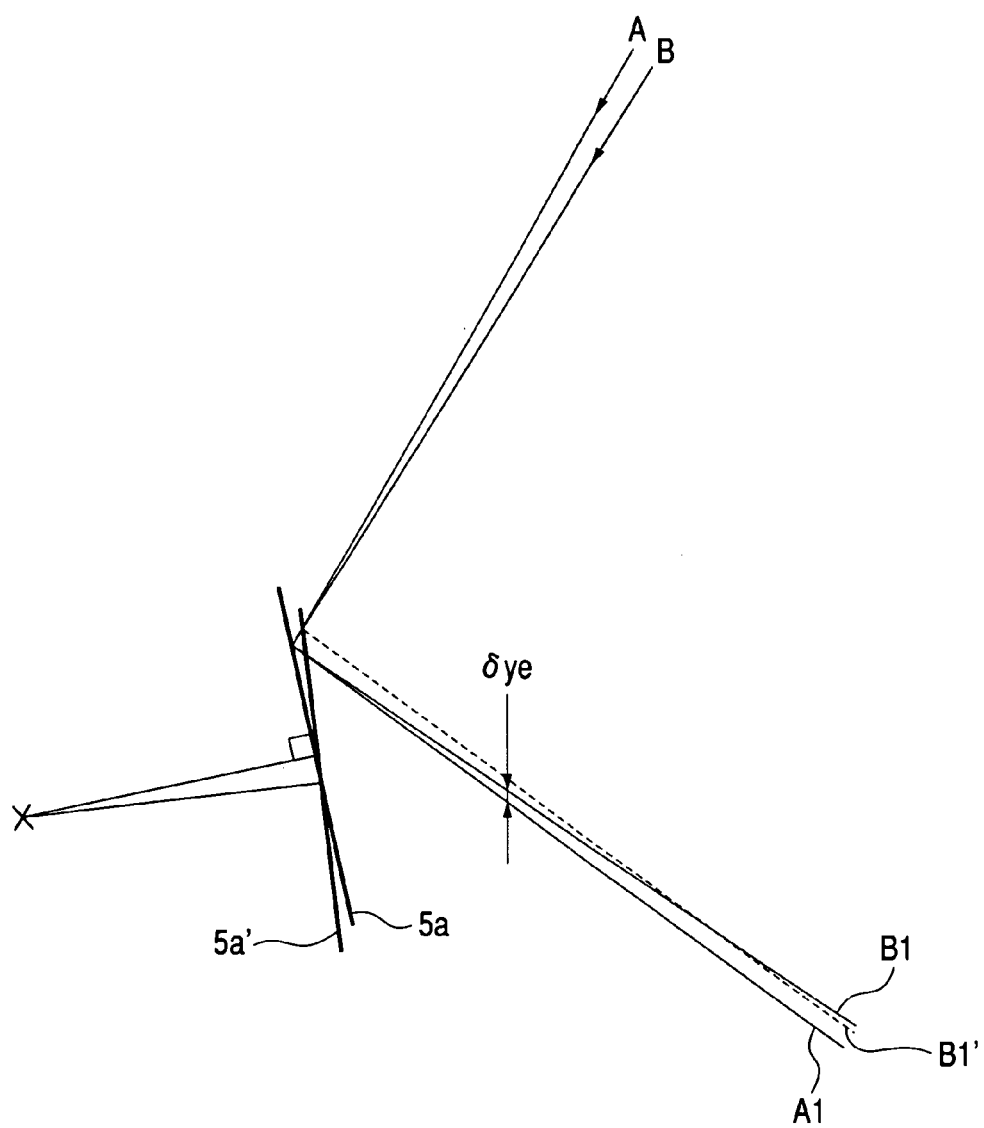
FIG. 24 is a diagram illustrating a state in which principal rays of plural light beams on a scanning end side are reflected by a polygon.

FIG. 24 is an explanatory diagram showing a state in which principal rays of two light beams on the scanning end side are deflected and reflected on the reflection surface of the polygon mirror 5.

In the figure, first, a light beam, which is emitted from the luminescence part A, is reflected on the reflection surface 5a of the polygon mirror 5 in a direction of A1 in the figure and focused on the photosensitive drum surface 7 by the fθ lens system (not shown) 6.

Next, a light beam, which is emitted from the luminescence part B at a time staggered by the predetermined time δT, is reflected by the reflection surface 5' in the direction of B1' in the figure, that is, the same direction as A1 in the figure. At this point, the principal rays of the respective light beams are made incident on the fθ lens system 6 deviating in the main-scanning direction by δye.

Figure 26:
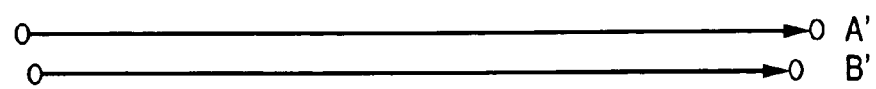
FIG. 26 is a diagram showing a state of scanning lines which are formed by plural beams on a drum surface in the case in which plural light beams to be made incident on an fθ lens are convergent beams.
Figure 27:
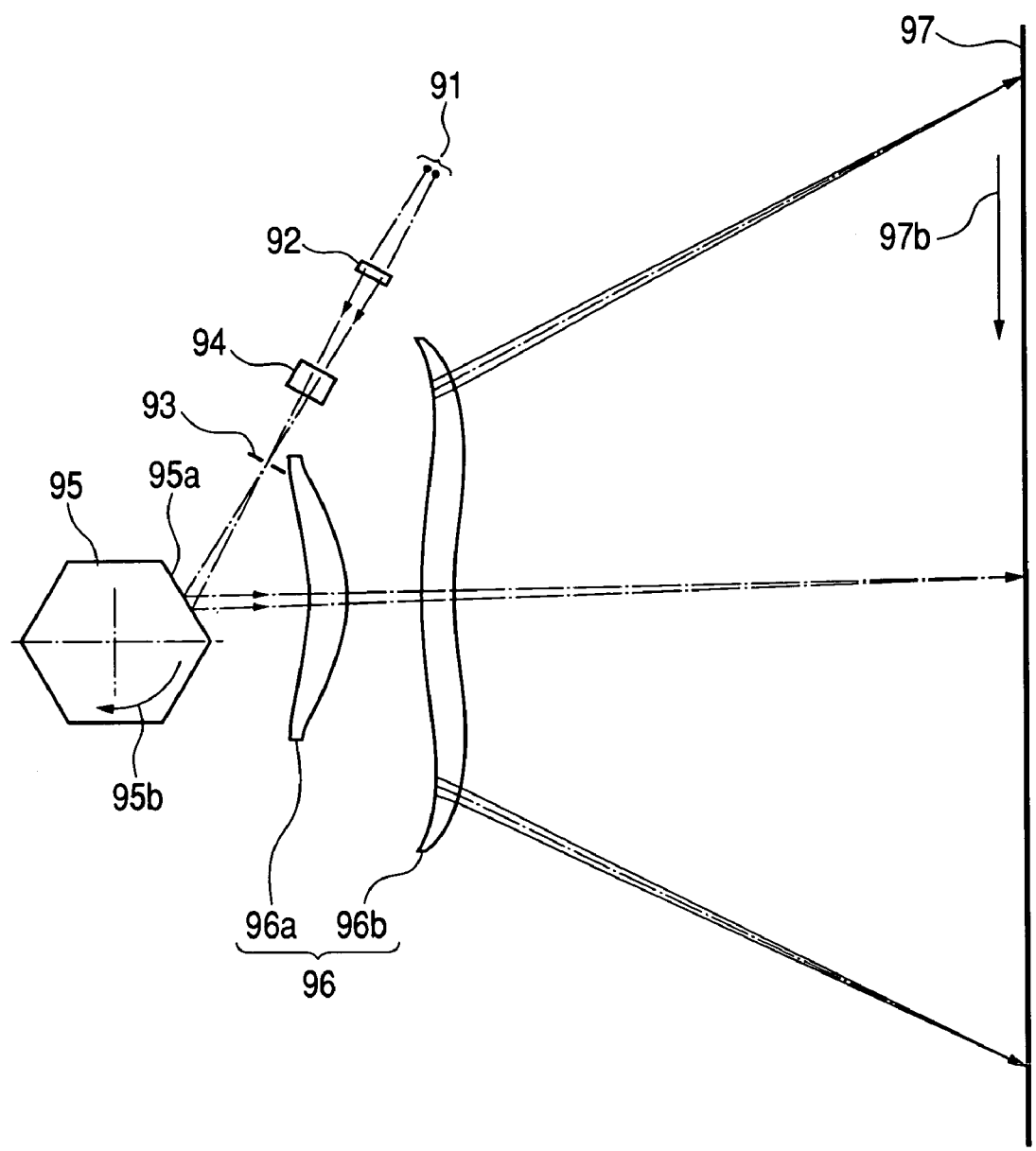
FIG. 27 is a main-scanning sectional view of a conventional multi-beam optical scanning device.
Figure 28:
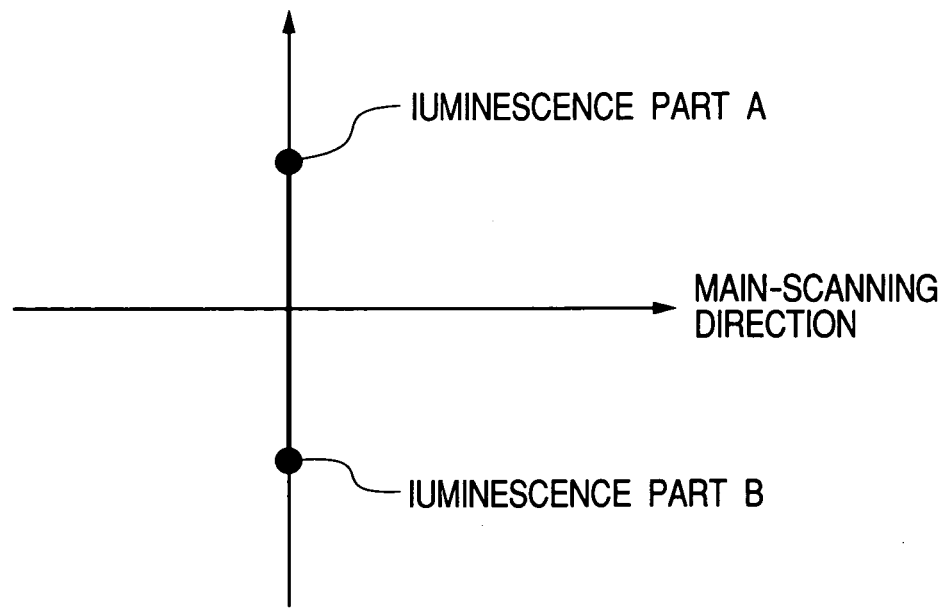
FIG. 28 is a diagram showing how luminescence points of the conventional multi-beam optical scanning device are arranged.

As it is seen from FIGS. 23 and 24, the light beam B' emitted from the luminescence part B deviates further to an optical axis side than the light beam A' emitted from the luminescence part A both on the scanning start side and the scanning end side. Thus, as shown in FIG. 26, a line (scanning line) scanned by the light beam B' is shorter than a line scanned by the light beam A' on the photosensitive drum surface 7.

In short, in the case in which the two light beams made incident on the fθ lens system 6 are convergent light beams, a deviation amount δY2 in the main-scanning direction is generated in the focusing points of the respective light beams on the photosensitive drum surface 7.

On the other hand, in the case in which a relative wavelength difference exists in light beams emitted from respective luminescent parts of a semiconductor laser having plural luminescence part, as it is well known, a magnification chromatic aberration is caused by an fθ lens system. As a result, a deviation amount δY3 in the main-scanning direction is generated in the focusing points of the respective light beams on the surface to be scanned due to the relative wavelength difference.

In this embodiment, in the sub-scanning section, the respective light beams are made incident on the photosensitive drum surface 7 such that the principal rays thereof forms an angle, which is not zero, with respect to the normal line of the photosensitive drum surface 7, respectively. Consequently, when it is assumed that a maximum value of a positional deviation amount, which is generated in a first direction relatively parallel to the main-scanning direction between the focusing points of the respective light beams on the photosensitive drum surface 7, is δY1, a maximum value of a positional deviation amount, which is generated in a second direction relatively parallel to the main-scanning direction between the focusing points of the respective light beams on the photosensitive drum surface 7 as convergent light beams or divergent light beams are made incident on the fθ lens system 6 in the main scanning direction, is δY2, and a maximum value of a positional deviation amount, which, when the light beams emitted from the two luminescence parts A and B have a relative wavelength difference, is caused in a third direction relatively parallel to the main-scanning direction between the focusing points of the respective light beams on the photosensitive drum surface 7 due to the relative wavelength difference, is δY3, the following conditional expression is satisfied:

$$|\delta Y1+\delta Y2+\delta Y3| \leq MAX(|\delta Y1|, |\delta Y2|, |\delta Y3|) \quad (1)$$

where, MAX(|δY1|, |δY2|, |δY3|) is a largest value of absolute values of δY1, δY2 and δY3.

In other words, in this embodiment, a deviation of focusing positions in the main-scanning direction of plural spots is effectively corrected in an entire area of a surface to be scanned consisting of a photosensitive drum or the like by optimally selecting and setting the incident angle β the distance Sd from the light outgoing side principal plane 11 of the fθ lens system 6 to the natural convergent point 14 of the convergent light beams to be made incident on the fθ lens system 6, the distance Sk from the light outgoing side principal plane 11 of the fθ lens system 6 to the position 12, in which the convergent light beams made incident on the fθ lens system 6 are converged and focused by the fθ lens system 6, and the like such that a total positional deviation amount is made smaller than or equal to the largest value of the absolute values of the positional deviation amounts δY1, δY2 and δY3 so as to satisfy the conditional expression (1) and that an amount found by adding the positional deviation amount δY1, the positional deviation amount δY2, and the positional deviation amount δY3 are in directions in which the amounts are deviated in opposite directions and offset each other.

Incidentally, it is likely that the predetermined incident angle β in the sub-scanning direction, which is formed by the two light beams to be made incident on the photosensitive drum surface 7 and the normal line of the photosensitive drum surface 7, cannot be set arbitrarily depending upon a structure of the inside of the image forming apparatus. In such a case, since it is difficult to correct a deviation of focusing positions in the main-scanning direction of two spots almost completely, it is sufficient to correct the deviation to an allowable level for an image.

In general, a positional deviation of focusing points in the main-scanning direction tends to be visually recognized when the positional deviation exceeds 14 μm (0.014 mm), and influence of the positional deviation on an image cannot be neglected.

Therefore, it is preferable that the following conditional expression is satisfied when the positional deviation amounts δY1, δY2 and δY3 are represented by a unit of mm, respectively.

$$|\delta Y1+\delta Y2+\delta Y3| \leq 0.014 \text{ (mm)} \quad (2)$$

Here, when it is assumed that a ratio of the distance Sd from the light outgoing side principal plane 11 of the fθ lens system 6 to the natural convergent point 14 of the convergent light beams to be made incident on the fθ lens system 6 and the distance Sk from the light outgoing side principal plane 11 of the fθ lens system 6 to the position 12, in which the convergent light beams made incident on the fθ lens system 6 are converged and focused by the fθ lens system 6, is a degree of non-parallelism represented as K=Sk/Sd, the positional deviation amount δY2 can be increased and offset the positional deviation amount δY1 more easily as a value of K is larger, that is, the degree of non-parallelism is higher.

However, if the degree of non-parallelism K is too high, jitter of a period of the number of polygon surfaces, which is caused due to errors of a rotation center of the polygon mirror 5 and a distance to the respective polygon surfaces from the rotation center, increases. Thus, in this embodiment, the positional deviation amount δY1 in the main-scanning direction of the focusing positions of the respective spots, which is generated in the case in which the two light beams to be made incident on the photosensitive drum surface 7 and the normal line of the photosensitive drum surface 7 are arranged forming the predetermined incident angle β in the sub-scanning direction, is offset by the amount found by adding the positional deviation amount δY2 in the main-scanning direction of the focusing positions of the respective spots, which is generated in the case in which the plural light beams made incident on the fθ lens system 6 are convergent light beams, and the positional deviation amount δY3 in the main-scanning direction of the focusing position of the respective spots, which is generated due to magnification chromatic aberration caused by a relative wavelength difference of the light beams emitted from the two luminescence parts, rather than being offset only by the positional deviation amount δY2.

In this way, an amount of jitter of a period of the number of polygon surfaces, which is generated due to errors of a rotation center of the polygon mirror 5 and a distance to the respective polygon surfaces from the rotation center, is set to be small.

In other words, it is preferable that the positional deviation amount δY1, the positional deviation amount δY2, and the positional deviation amount δY3 satisfy the following conditional expression:

$$\delta Y1 \times (\delta Y2 + \delta Y3) < 0 \qquad (3)$$

The above description is on the assumption that there are two luminescence parts for ease of understanding. However, it would be easily understood that, in this embodiment, the number of luminescence parts is not limited to two, and further effects can be obtained in the case in which the number of luminescence parts is as many as three or more.

Properties of the multi-beam optical scanning device of the first embodiment of the present invention are shown in Tables 1 and 2.

TABLE 2

Shape of fθ lens

| | First surface | | Second surface |
|---|---|---|---|
| First fθ lens | | | |
| R | −42.21306 | R | −35.22468 |
| k | −6.71975E+00 | ku | −1.06781E+00 |
| B4 | 2.48286E−06 | B4u | 7.18895E−06 |
| B6 | 1.48860E−09 | B6u | 0.00000E+00 |
| B8 | 0.00000E+00 | B8u | 0.00000E+00 |
| B10 | 0.00000E+00 | B10u | 0.00000E+00 |
| r | −22.80490 | r | −22.00000 |
| D2 | 0.00000E+00 | D2u | 0.00000E+00 |
| D4 | 0.00000E+00 | D4u | 0.00000E+00 |
| D6 | 0.00000E+00 | D6u | 0.00000E+00 |
| D8 | 0.00000E+00 | D8u | 0.00000E+00 |
| D10 | 0.00000E+00 | D10u | 0.00000E+00 |
| Second fθ lens | | | |
| R | 253.47332 | R | 355.02833 |
| k | −1.60613E+01 | k | 1.06354E+01 |
| B4 | −1.28956E−06 | B4 | −2.09072E−06 |
| B6 | 2.63241E−10 | B6 | 4.91479E−10 |
| B8 | −1.50049E−14 | B8 | −1.15785E−13 |
| B10 | 2.50397E−18 | B10 | 1.81213E−17 |

TABLE 1

| | | |
|---|---|---|
| Reference wavelength of use | λ (nm) | 780 |
| Number of luminescence points | N | 2 |
| Interval of luminescence points | l | 0.10000 |
| Thickness of semiconductor laser cover glass | d0 | 0.25000 |
| Refractive index of semiconductor laser cover glass | n0 | 1.51072 |
| Light source to first surface of collimator lens | d0 | 30.50000 |
| Curvature radius of first surface of collimator lens | R1 | 178.47200 |
| Thickness of collimator lens | d1 | 2.00000 |
| Refractive index of collimator lens | n1 | 1.76203 |
| Curvature radius of second surface of collimator lens | R2 | −26.64500 |
| First surface of collimator lens to first surface of cylindrical lens | d2 | 18.90000 |
| Curvature radius in sub-scanning direction of first surface of cylindrical lens | Rs3 | 41.28700 |
| Curvature radius in main-scanning direction of first surface of cylindrical lens | Rm3 | ∞ |
| Thickness of cylindrical lens | d3 | 7.00000 |
| Refractive index of cylindrical lens | n3 | 1.51072 |
| Curvature radius of second surface of cylindrical lens | R4 | ∞ |
| Second surface of cylindrical lens to aperture stop | d4 | 31.60000 |
| Aperture stop to polygon deflective reflection surface | d5 | 40.00000 |
| Polygon deflective reflection surface to first surface of first fθ lens | d6 | 22.89963 |
| Thickness of first fθ lens | d7 | 7.00000 |
| Refractive index of first fθ lens | n7 | 1.52420 |
| Second surface of first fθ lens to first surface of second fθ lens | d8 | 29.76089 |
| Thickness of second fθ lens | d9 | 8.38328 |
| Refractive index of second fθ lens | n9 | 1.52420 |
| Second surface of second fθ lens to surface to be scanned | d10 | 188.44984 |
| Rear side principal plane of fθ lens to natural convergent point of convergent light beam | Sd | 1034.45644 |
| Rear side principal plane of fθ lens to focusing position | Sk | 202.92744 |
| fθ coefficient | f | 212.71058 |
| Angle formed by light beam to be made incident on drum and normal line of drum | β | 6.00000 |
| Incident angle on polygon of incidence optical system | γ | 70.00000 |
| Focal length of collimator lens | fcol | 30.55254 |
| Interval of luminescence points of plural luminescence parts | d | 0.10000 |
| Radius of circle inscribed in polygon | r | 17.32051 |
| Maximum scanning angle | η | 41.75084 |
| Maximum value of angle formed by light beam to be made incident on surface to be scanned and normal line of surface to be scanned | θ | 29.30600 |
| Maximum value of wavelength difference of plural light beams | δλ | 2 nm |
| Interval of focusing points in sub-scanning direction | P | 42.3 μm |
| Number of polygon surfaces | n | 6 |

TABLE 2-continued

Shape of fθ lens

| First surface | | Second surface | |
|---|---|---|---|
| r | −33.18880 | r | −16.66179 |
| D2 | 9.52758E−04 | D2u | 3.97028E−04 |
| D4 | 5.21274E−07 | D4u | −6.03986E−08 |
| D6 | 6.19534E−11 | D6u | 6.50107E−12 |
| D8 | 5.64268E−14 | D8u | 0.00000E+00 |
| D10 | 0.00000E+00 | D10u | 0.00000E+00 |
| | | D21 | 4.15078E−04 |
| | | D41 | −6.46424E−08 |
| | | D61 | 8.01461E−12 |
| | | D81 | 0.00000E+00 |
| | | D101 | 0.00000E+00 |

Here, when it is assumed that a point of intersection of the respective lens surfaces and the optical axis is an origin, an optical axis direction is the X axis, an axis perpendicular to the optical axis in the main-scanning section is the Y axis, and an axis perpendicular to the optical axis in the sub-scanning section is the Z axis, an aspheric shape of the main-scanning section of the fθ lens system 6 is represented by the following aspheric formula:

[Expression 4]

$$x = \frac{y^2/R}{1+(1-(1+k)(y/R)^2)^{1/2}} + B_4 y^4 + B_6 y^6 + B_8 y^8 + B_{10} y^{10}$$

Note that R indicates a curvature radius, and k and $B_4$ to $B_{10}$ indicate aspheric coefficients.

In a shape of one sub-scanning section, a curvature radius r' in a normal line direction of the main-scanning surface, in which a lens surface coordinate in the main-scanning direction is y, is represented by the following expression:

$$r' = r(1 + D_2 y^2 + D_4 y^4 + D_6 y^6 + D_8 y^8 + D_{10} y^{10})$$ [Expression 5]

Note that r indicates a curvature radius on the optical axis, and $D_2$ to $D_{10}$ indicate coefficients.

Here, in the case in which the respective coefficients are different depending upon plus and minus of a value of y, when the value of y is plus, the curvature radius r' is calculated using $D_{2u}$ to $D_{10u}$ with a subscript u as coefficients. When the value of y is minus, the curvature radius r' is calculated using $D_{21}$ to $D_{101}$ with a subscript 1 as coefficients.

In the multi-beam optical scanning device of this embodiment, as shown in FIG. 1, the two luminescence parts A and B are arranged, and an interval d of the two luminescence parts A and B is 0.1 mm. In the sub-scanning section, the luminescence part A is arranged on the upper side and the luminescence part B is arranged on the lower side. Light beams emitted from the respective luminescence parts A and B pass through the condensing lens 2 and the cylindrical lens 4 to be focused in a linear shape oblong in the main-scanning direction on the reflection surface 5a of the polygon mirror 5.

As shown in FIG. 2, on the reflection surface 5a of the polygon mirror 5, the light beam emitted from the luminescence part A is focused on the lower side, and the light beam emitted from the luminescence part B is focused on the upper side. Thereafter, the light beams reflected on the reflection surface 5a of the polygon mirror 5 are focused in a spot shape on the photosensitive drum surface 7 by the fθ lens system 6. On the photosensitive drum surface 7, the light beam emitted from the luminescence part A is focused on the upper side, and the light beam emitted from the luminescence part B is focused on the lower side.

In FIG. 2, the normal line of the photosensitive drum surface 7 and the light beams from the respective luminescence parts A and B are arranged to form an angle β in the sub-scanning direction. Here, referring to FIG. 22, in the case in which two light beams and a photosensitive drum are arranged, a line scanned by a light beam on the upper side of the figure is longer than a line scanned by a light beam on the lower side of the figure.

Figure 3:
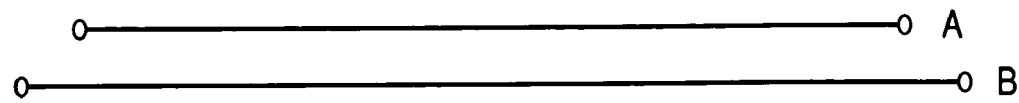
FIG. 3 is a diagram illustrating a first positional deviation in the first embodiment of the present invention.

It would be easily understood that, in this embodiment, since the angle β in the sub-scanning direction is set as shown in FIG. 2, a positional deviation of focusing of the light beams emitted from the respective luminescence parts A and B is caused on the photosensitive drum surface 7 as shown in FIG. 3, whereby a line scanned by the light beam from the luminescence part A is short, and a line scanned by the light beam from the luminescence part B is long.

This positional deviation will be hereinafter referred to as a first positional deviation.

Figure 4:
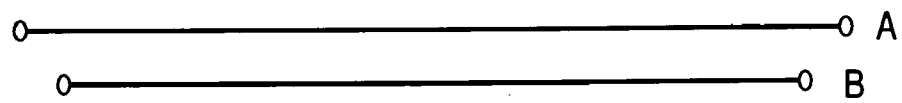
FIG. 4 is a diagram illustrating a second positional deviation in the first embodiment of the present invention.

On the other hand, as illustrated in FIGS. 23 and 24, in the case in which the luminescence parts A and B are arranged as shown in FIG. 1 of this embodiment, if light beams emitted from the condensing lens 2 are convergent light beams, as shown in FIG. 4, a line scanned by the light beam from the luminescence part A is long, and a line scanned by the light beam from the luminescence part B is short.

This positional deviation will be hereinafter referred to as a second positional deviation.

Figure 5:
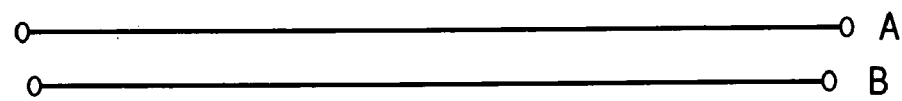
FIG. 5 is a diagram illustrating a third positional deviation in the first embodiment of the present invention.

In addition, in the case in which a relative wavelength difference exists in the light beams emitted from the two luminescence parts A and B, as it is well known, magnification chromatic aberration is caused. Wavelength dependency of a refractive index of a general optical glass and a plastic material for optics has a characteristic that a refractive index decreases as a wavelength increases. Thus, in this embodiment, a wavelength of the light beam emitted from the luminescence part B is set to 780 nm which is a reference wavelength, and a wavelength of the light beam emitted from the luminescence part A is set to 782 nm which is 2 nm longer than the reference wavelength. In this case, as shown in FIG. 5, a line scanned by the light beam from the luminescence part A is long, and a line scanned by the light beam from the luminescence part B is short.

This positional deviation will be hereinafter referred to as a third positional deviation.

Figure 6:
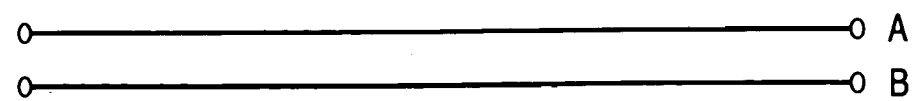
FIG. 6 is a diagram illustrating a state in which the first positional deviation is corrected by the second positional deviation and the third positional deviation in the first embodiment of the present invention.

In this embodiment, as described above, the first, the second and the third deviation amounts δY1, δY2 and δY3 are set so as to satisfy conditional expression (1). In addition, the second positional deviation and the third positional deviation are set in an opposite direction with respect to a direction of the first positional deviation such that an amount found by adding the second positional deviation amount and the third positional deviation amount are substantially equal to and offset by the first positional deviation amount. Finally, as shown in FIG. 6, it is possible to make lengths of a line scanned by the light beam from the luminescence part A and a line scanned by the light beam from the luminescence part B substantially equal.

Figure 7:
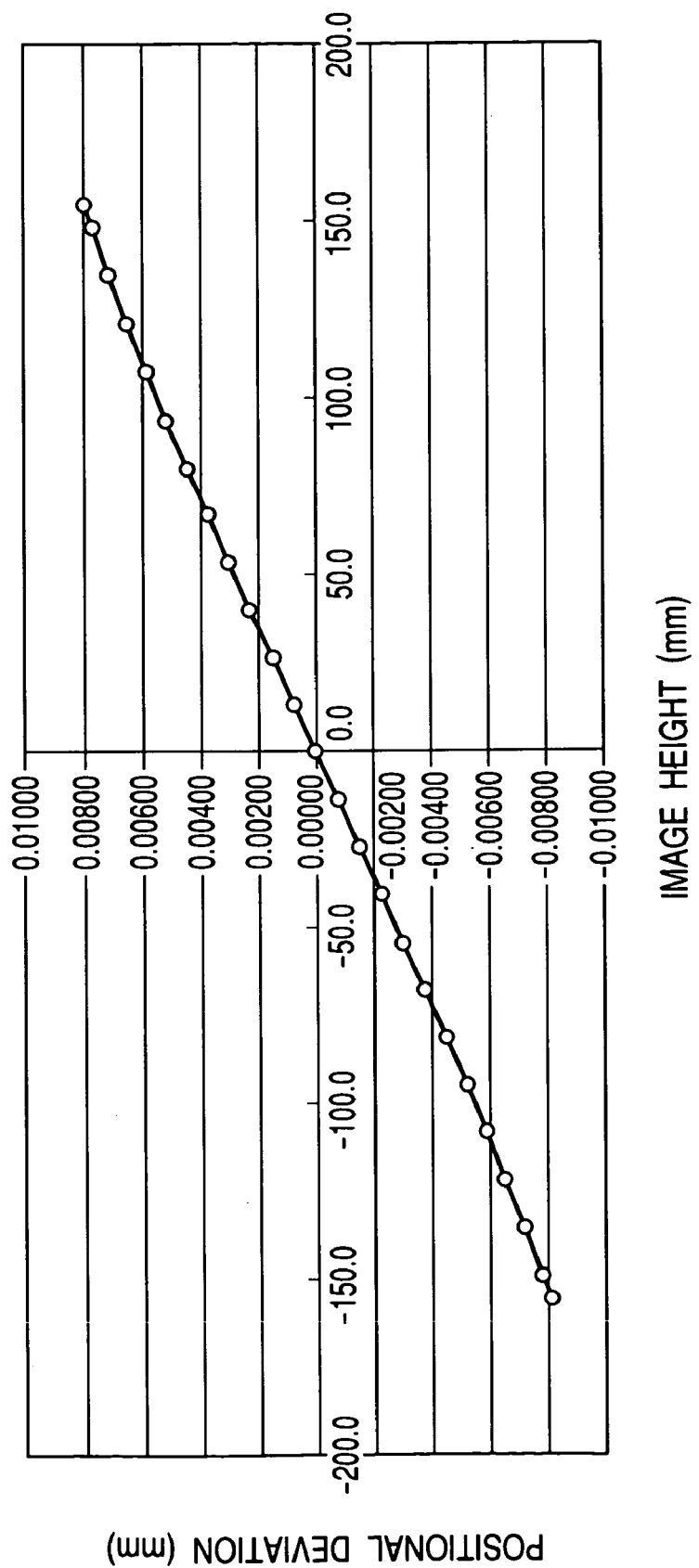
FIG. 7 is a diagram showing a first positional deviation amount in the first embodiment of the present invention.

FIG. 7 shows the positional deviation amount δY1 in this embodiment. In the figure, the horizontal axis indicates an image height, and a positional deviation amount is plotted by a unit of mm on the vertical axis. The figure shows a degree to which a focusing position of a light beam emitted from the luminescence part B deviates with respect to a focusing position of a light beam emitted from the luminance part A.

In this embodiment, when the focusing position of the light beam emitted from the luminance part B deviates in a plus direction with respect to the focusing position of the light beam, which is emitted from the luminescence part A, in a Y direction in the coordinate system in FIG. 22, the deviation is plotted in a plus direction of the vertical axis. Here, in this embodiment, the angle β in the sub-scanning direction in FIG. 2 is set to 20 degrees.

Figure 8:
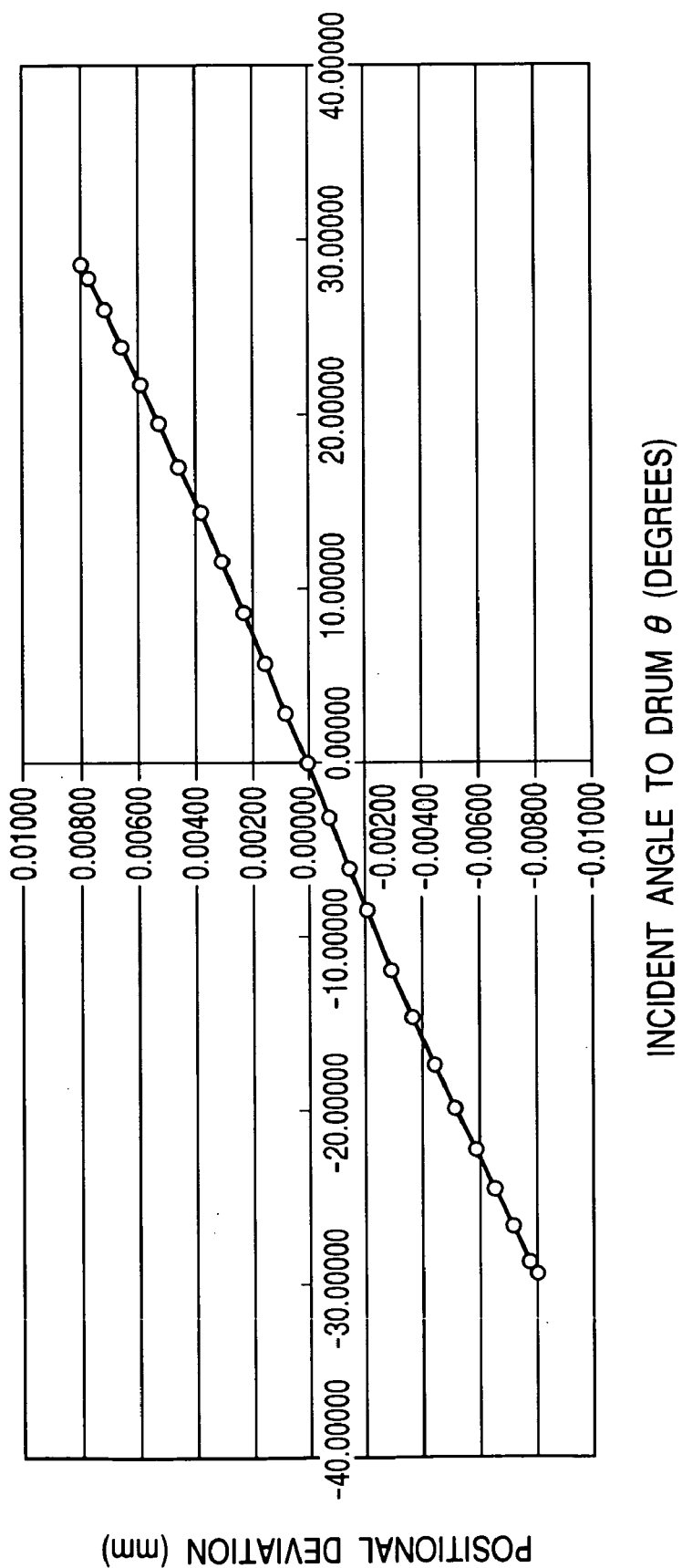
FIG. 8 is a diagram showing the first positional deviation amount in the first embodiment of the present invention with the horizontal axis changed.

In FIG. 8, the angle θ formed by the light beam used for scanning on the photosensitive drum surface 7 by the fθ lens system 6 in the main-scanning surface and the normal line of the photosensitive drum surface 7 is plotted on the horizontal axis instead of the image height in FIG. 7. In this embodiment, a maximum value $θ_{max}$ of the angle θ is set to 29.306 degrees.

Figure 9:
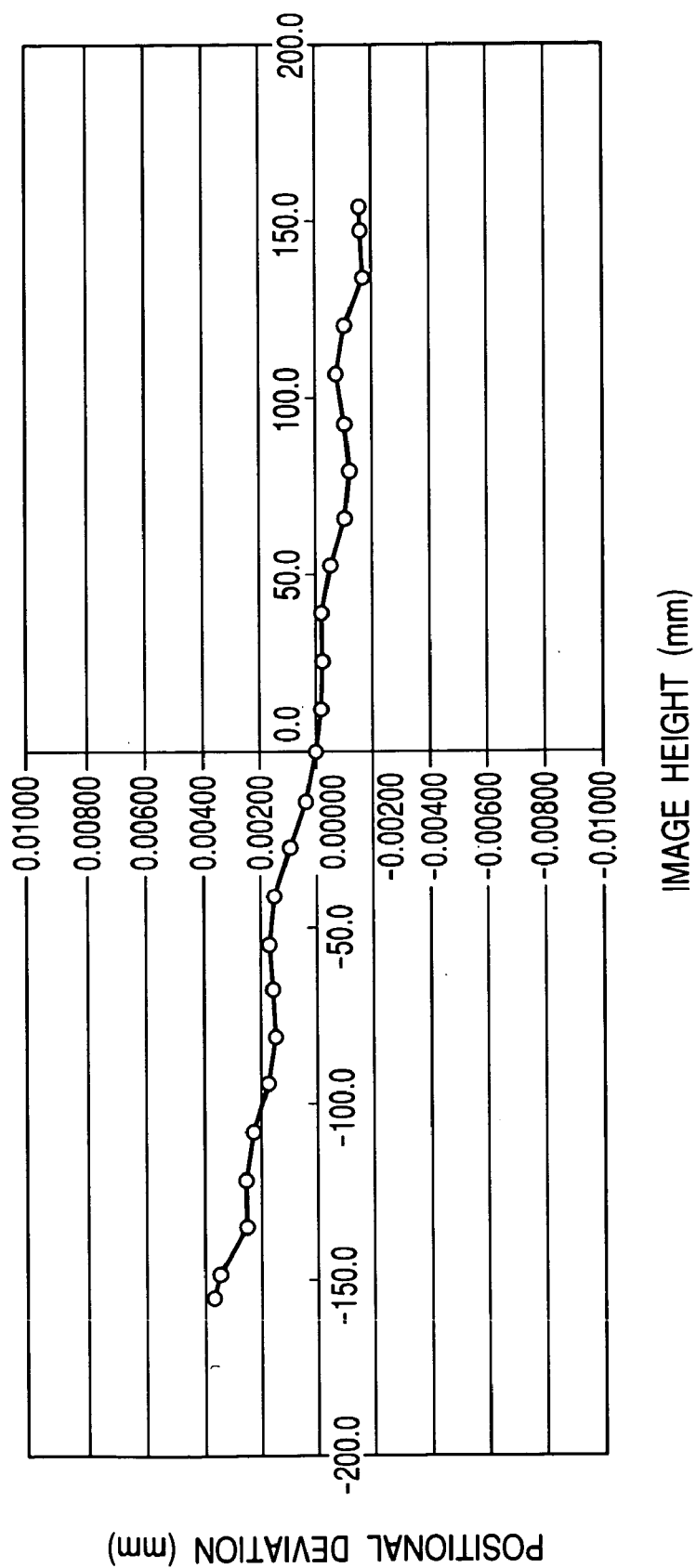
FIG. 9 is a diagram showing a second positional deviation amount in the first embodiment of the present invention.

Next, FIG. 9 shows the second positional deviation amount δY2 in this embodiment. In the figure, setting of the horizontal axis and the vertical axis is the same as FIG. 7.

In this embodiment, a convergent light beam, which is condensed in a position 1034.45644 mm from the light outgoing side principal plane of the fθ lens system 6, is made incident on the fθ lens system 6. The light beam is focused in a position 202.92744 mm from the light outgoing side principal plane of the fθ lens system 6 by the fθ lens system 6. The degree of non-parallelism K is set as K=Sk/Sd=0.19617. In addition, the focal length f of the condensing lens 2 is 30.55254 mm, and the interval d of the two luminescence parts A and B is 0.1 mm. Thus, a relative angle difference α in the main-scanning section of the principal ray of the two light beams emitted from the condensing lens 2 is 0.18753 degrees.

Figure 10:
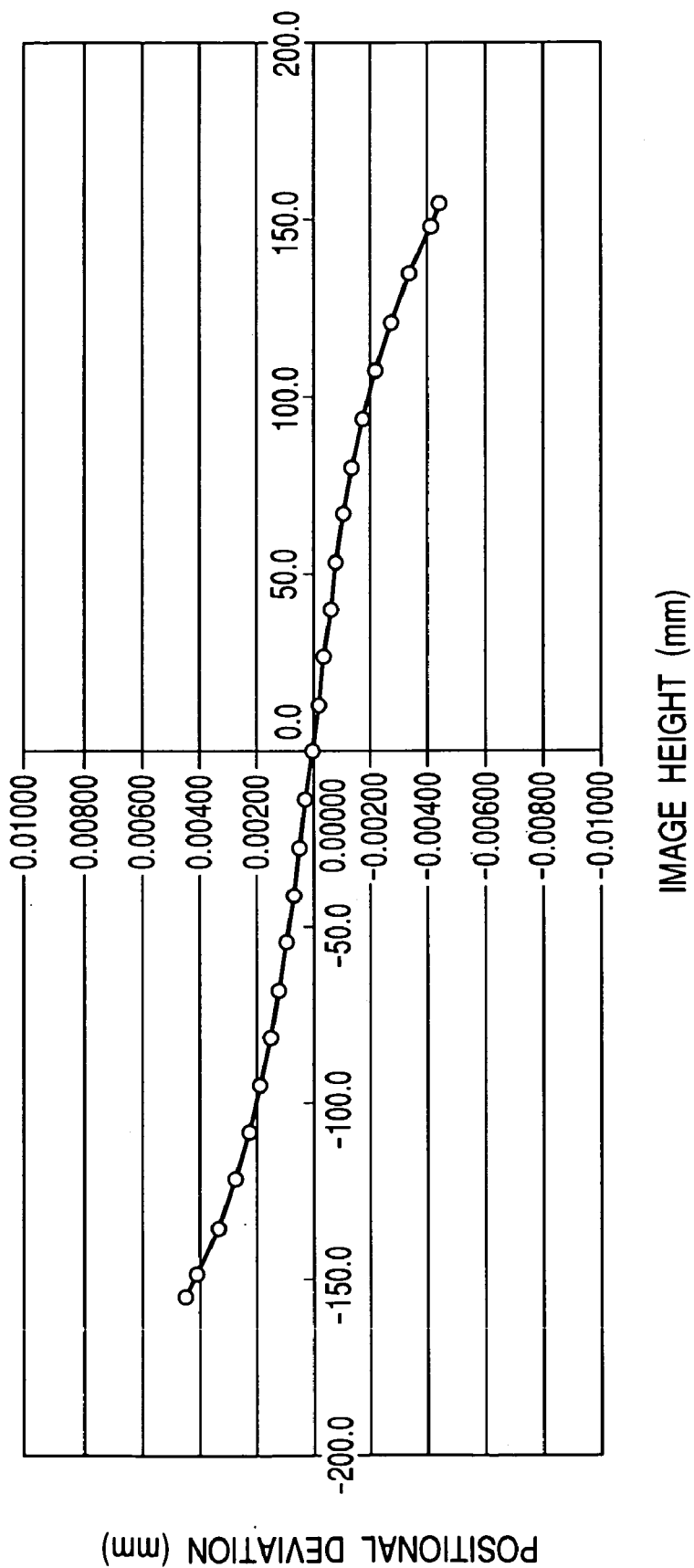
FIG. 10 is a diagram showing a third positional deviation amount in the first embodiment of the present invention.

In addition, FIG. 10 shows the third positional deviation amount δY3 in this embodiment. In the figure, setting of the horizontal axis and the vertical axis is the same as FIG. 7.

In this embodiment, a wavelength of the light beam emitted from the luminescence part B is set to 780 nm which is a reference wavelength, and a wavelength of the light beam emitted from the luminescence part A is set to 782 nm which is 2 nm longer than the reference wavelength.

Figure 11:
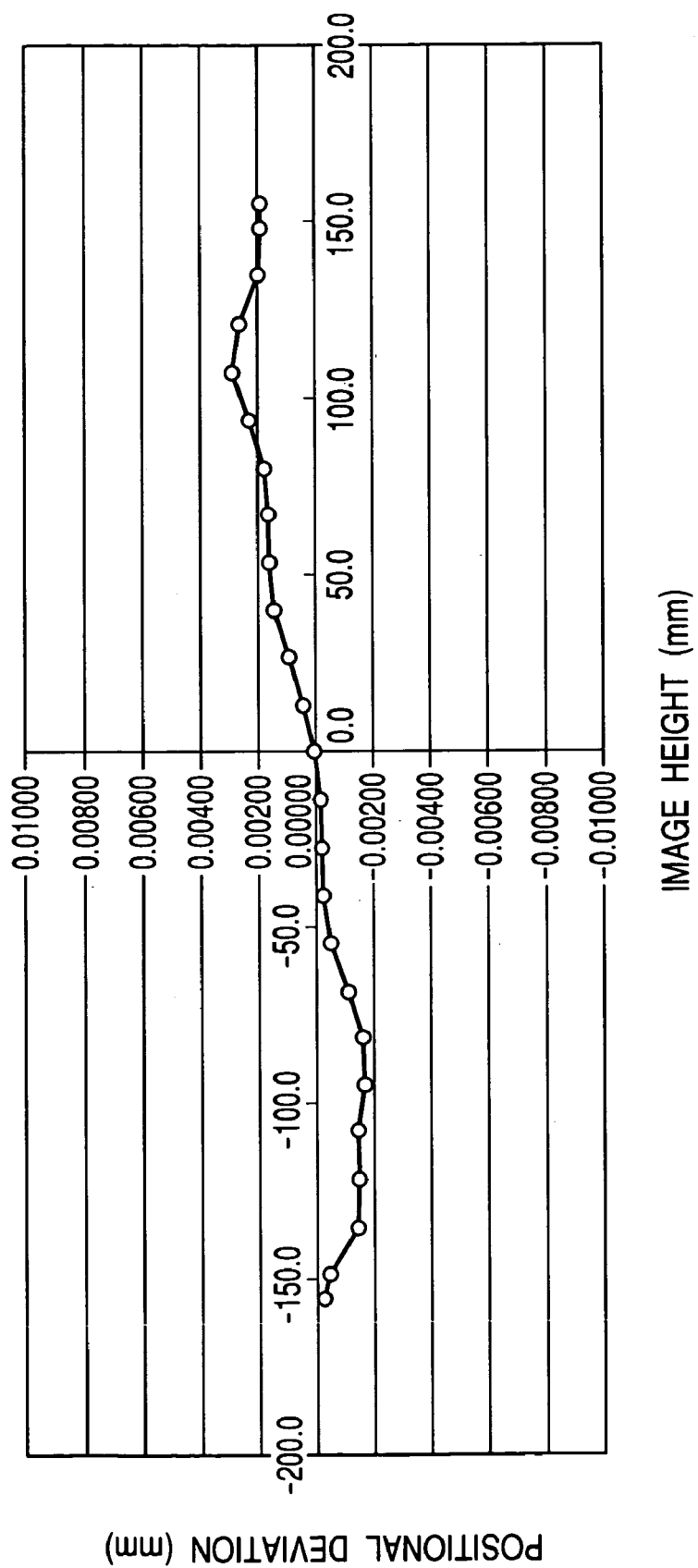
FIG. 11 is a diagram showing a total positional deviation amount after the first positional deviation is corrected by the second positional deviation and the third positional deviation in the first embodiment of the present invention.

A sum of the first, the second, and the third positional deviation amounts δY1, δY2 and δY3 is a total of actually remaining positional deviation amount. The total positional deviation amount is shown in FIG. 11. As it is seen from FIG. 11, the total positional deviation amount can be effectively corrected by the first positional deviation amount δY1 which is generated in the case in which the respective light beams to be made incident on the photosensitive drum surface 7 and the normal line of the photosensitive drum surface 7 are arranged forming the predetermined incident angle β in the sub-scanning direction, the second positional deviation amount δY2 which is generated by making convergent light beams incident on the fθ lens system 6, and the third positional deviation amount δY3 which is generated due to a relative wavelength difference of the respective light beams.

It is seen that, in this embodiment, a final total positional deviation amount is controlled to be smaller than or equal to a largest value of absolute values of the positional deviation amounts δY1, δY2 and δY3, and conditional expression (1) is satisfied. In addition, it is seen that the final total positional deviation amount is controlled to be a small amount of 3 μm (0.003 mm) or less in an entire effective scanning area, and conditional expression (2) is satisfied. Further, it is seen that, since the direction of the first positional deviation and the direction of the second positional deviation and the third positional deviation are opposite, conditional expression (3) is also satisfied.

As described above, in this embodiment, the relative angle difference α in the main-scanning section of the principal rays of the two light beams emitted from the condensing lens 2, the average value β of an angle which the principal rays of the two light beams to be made incident on the photosensitive drum in the sub-scanning direction forms with respect to the normal line of the photosensitive drum surface 7, the angle θ formed by the normal line of the photosensitive drum surface 7 in the maximum scanning position of the two light beams, which is used for scanning the photosensitive drum surface 7 by the fθ lens system 6 in the main-scanning section, and the two light beams, the relative wavelength difference δλ of the two light beams emitted from the two luminescence parts A and B, and the degree of non-parallelism K of the two light beams converted into convergent light beams (or divergent light beams) by the condensing lens 2 are optimally set, respectively, so as to satisfy conditional expression (1) and also satisfy conditional expression (2) and/or conditional expression (3).

This makes it possible to realize a multi-beam optical scanning device which effectively corrects a positional deviation of focusing in the main-scanning direction and is optimal for high-speed and a high image quality.

(Second Embodiment)

Next, a second embodiment of the present invention will be described.

Figure 12:
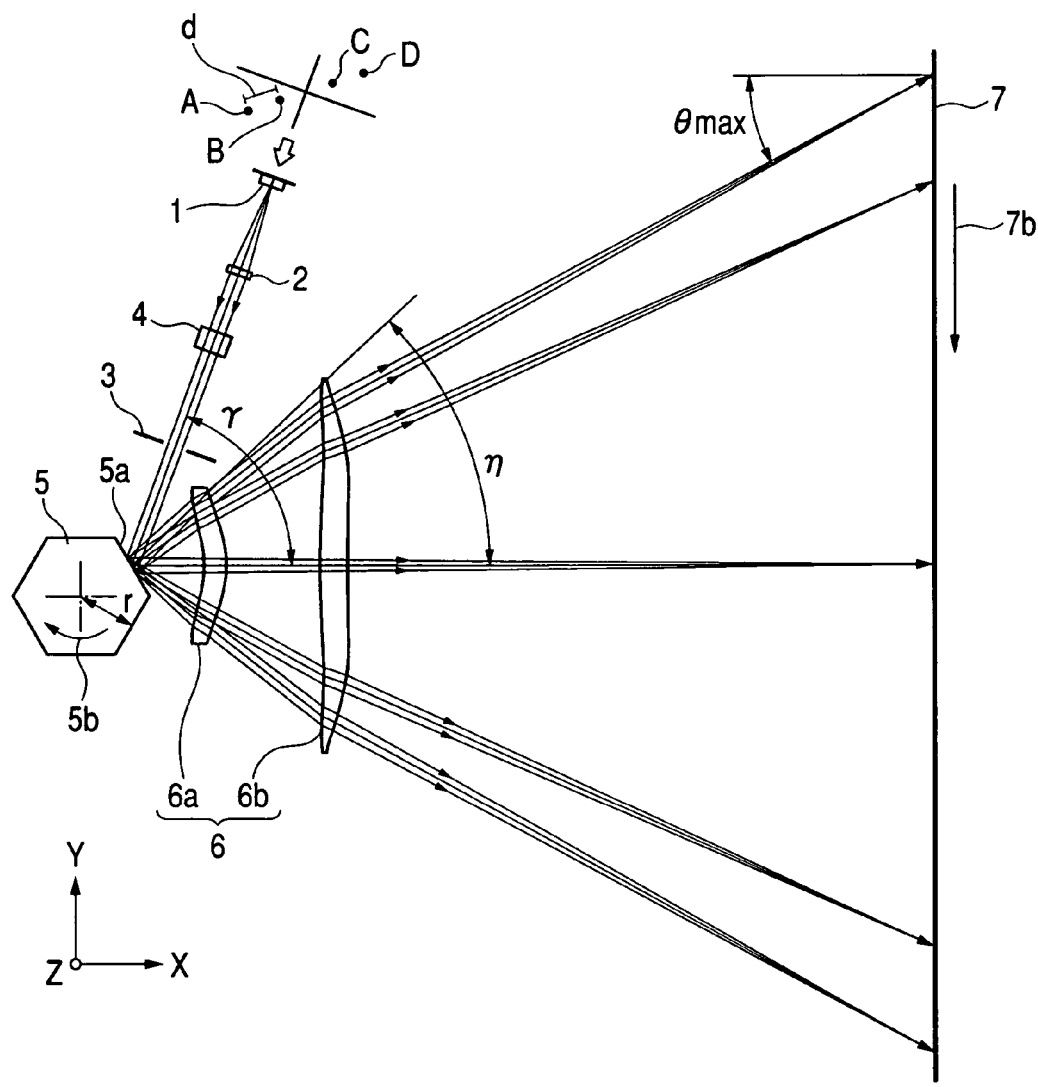
FIG. 12 is a main-scanning sectional view of a multi-beam optical scanning device in a second embodiment of the present invention.
Figure 13:
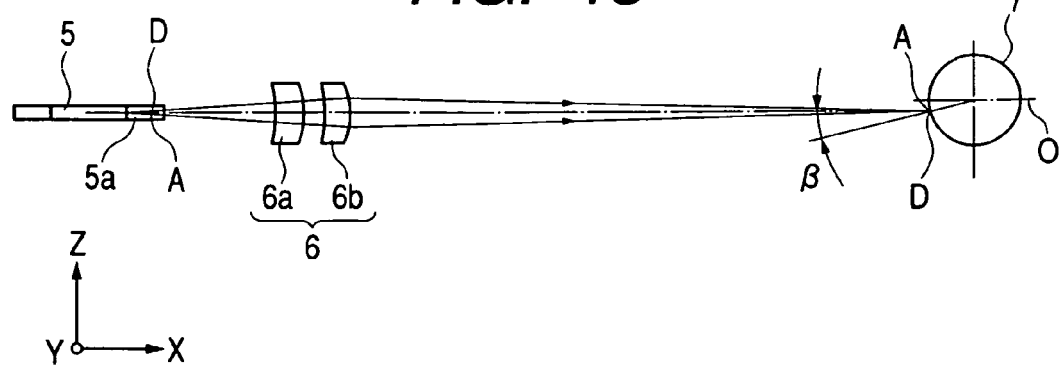
FIG. 13 is a sub-scanning sectional view of the multi-beam optical scanning device in the second embodiment of the present invention.

FIG. 12 is a sectional view of a principal part in a main-scanning direction (main-scanning sectional view) of the second embodiment of the present invention. FIG. 13 is a sectional view of a. principal part in a sub-scanning direction (sub-scanning sectional view) of FIG. 12. In FIGS. 12 and 13, elements identical with those shown in FIGS. 1 and 2 are denoted by the same reference numerals and signs.

This embodiment is different from the first embodiment in that:
(1) the number of luminescence parts N is changed from two to four (luminescence parts A, B, C and D);
(2) the angle β formed by the plural light beams in a sub-scanning section and the normal line of the photosensitive drum surface 7 is changed from 20 degrees to 14.1 degrees; and
(3) a wavelength of a light beam emitted from the luminescence part D is set to 780 nm which is a reference wavelength, and a wavelength of a light beam emitted from the luminescence part A is set to 785 nm which is longer than the reference wavelength by 5 nm.

The other parts of the structure and optical actions are substantially the same as those in the first embodiment, whereby the same effects are obtained.

In short, it would be easily understood that, in this embodiment, as the number of luminescence parts N increases, the first positional deviation amount δY1 increases. In this embodiment, a further effect is shown as the number of luminescence parts N increases.

Figure 14:
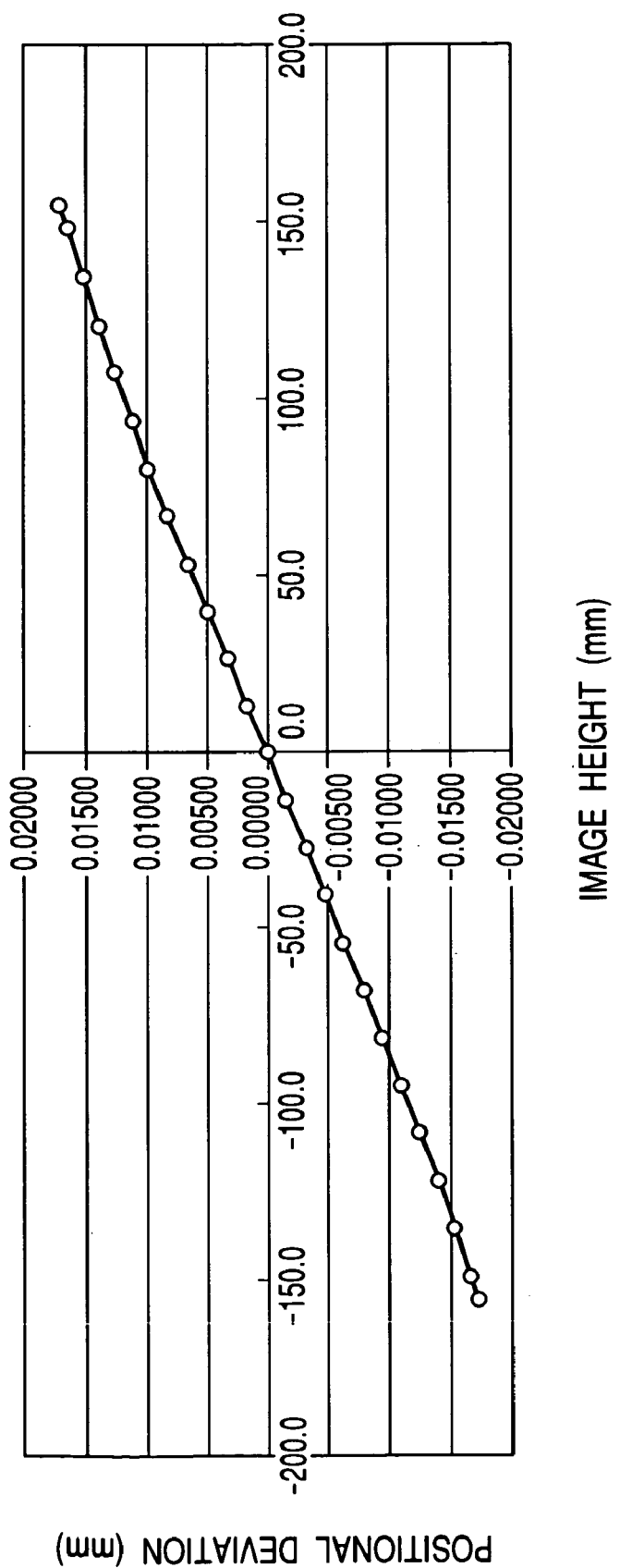
FIG. 14 is a diagram showing a first positional deviation amount in the second embodiment of the present invention.

FIG. 14 shows the first positional deviation amount δY1 in this embodiment. In the figure, the horizontal axis indicates an image height, and a positional deviation amount is plotted by a unit of mm on the vertical axis. The figure shows a degree to which a focusing position of a light beam emitted from the luminescence part D deviates with respect to a focusing position of a light beam emitted from the luminance part A.

In this embodiment, when the focusing position of the light beam emitted from the luminance part D deviates in a plus direction with respect to the focusing position of the light beam, which is emitted from the luminescence part A, in a Y direction in the coordinate system in FIG. 22, the deviation is plotted in a plus direction of the vertical axis. It is seen that, compared with FIG. 7, the positional deviation amount clearly increases. In this embodiment, the angle β in the sub-scanning direction in FIG. 13 is set to 14.1 degrees.

Figure 15:
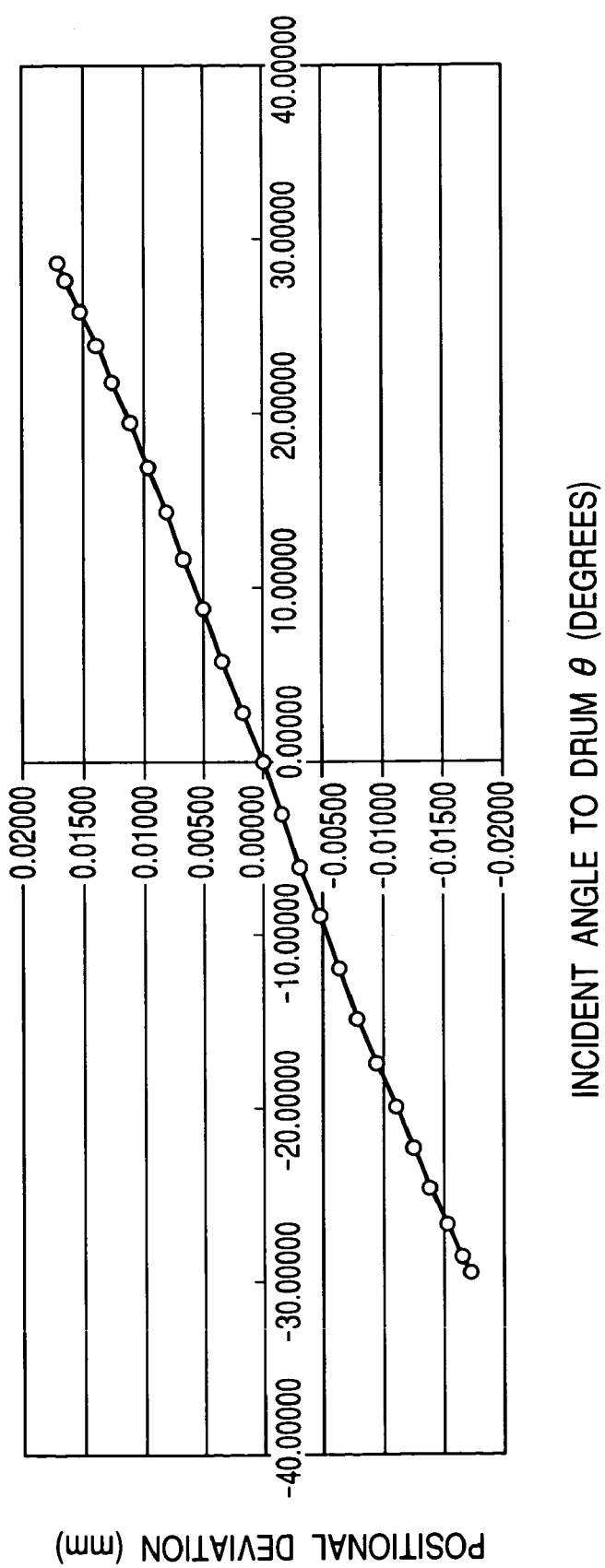
FIG. 15 is a diagram showing the first positional deviation amount in the second embodiment of the present invention with the horizontal axis changed.

In FIG. 15, the angle θ formed by the light beam used for scanning on the photosensitive drum surface 7 by the fθ lens system 6 in the main-scanning surface and the normal line of the photosensitive drum surface 7 is plotted on the horizontal axis instead of the image height in FIG. 14. In this embodiment, a maximum value $\theta_{max}$ of the angle θ is set to 29.306 degrees as in the first embodiment.

Figure 16:
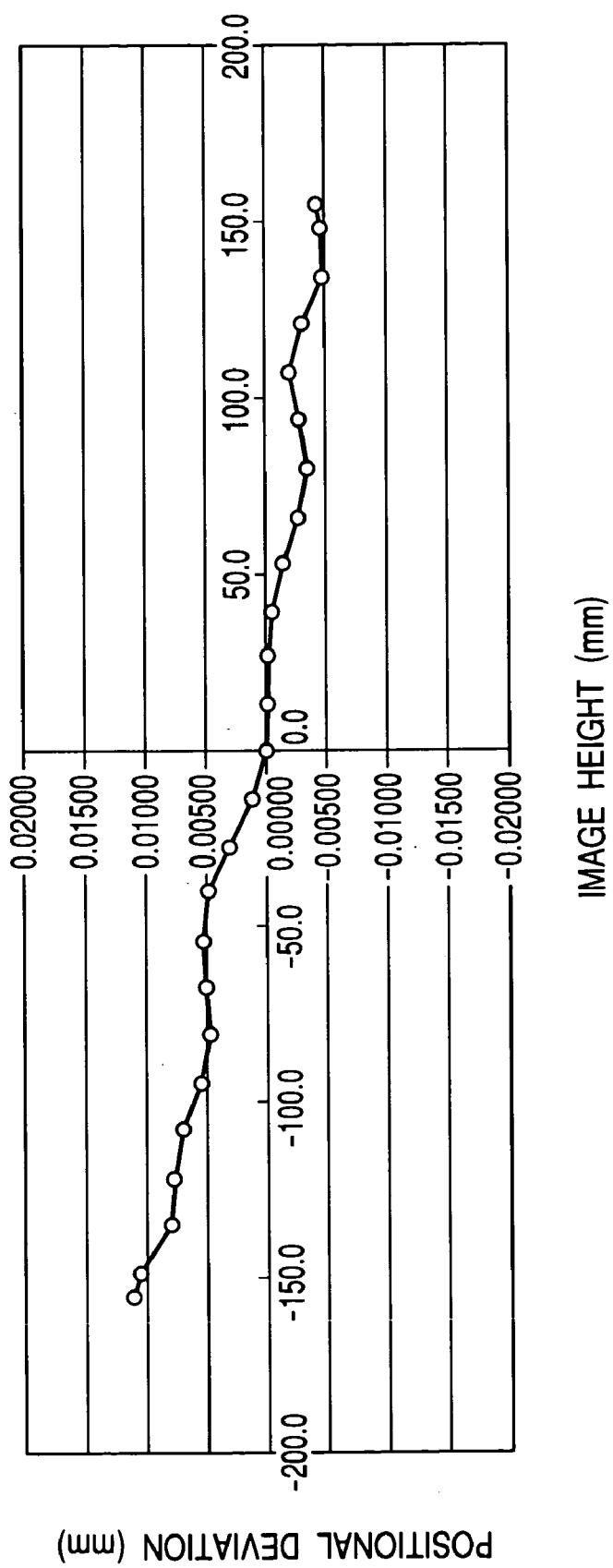
FIG. 16 is a diagram showing a second positional deviation amount in the second embodiment of the present invention.

Next, FIG. 16 shows the second positional deviation amount δY2 in this embodiment. In the figure, setting of the horizontal axis and the vertical axis is the same as FIG. 14.

In this embodiment, as in the first embodiment, a convergent light beam, which is condensed in a position 1034.45644 mm from the light outgoing side principal plane of the fθ lens system 6, is made incident on the fθ lens system 6. The light beam is focused in a position 202.92744 mm from the light outgoing side principal plane of the fθ lens system 6 by the fθ lens system 6. The degree of non-parallelism K is set as K=Sk/Sd=0.19617. In addition, a focal length fcol of the condensing lens 2 is 30.55254 mm, and the interval d of the four luminescence parts A, B, C and D is 0.1 mm. Thus, a maximum value α of a relative angle difference in the main-scanning section of the principal ray of the four light beams emitted from the condensing lens 2 is 0.56259 degrees.

Figure 17:
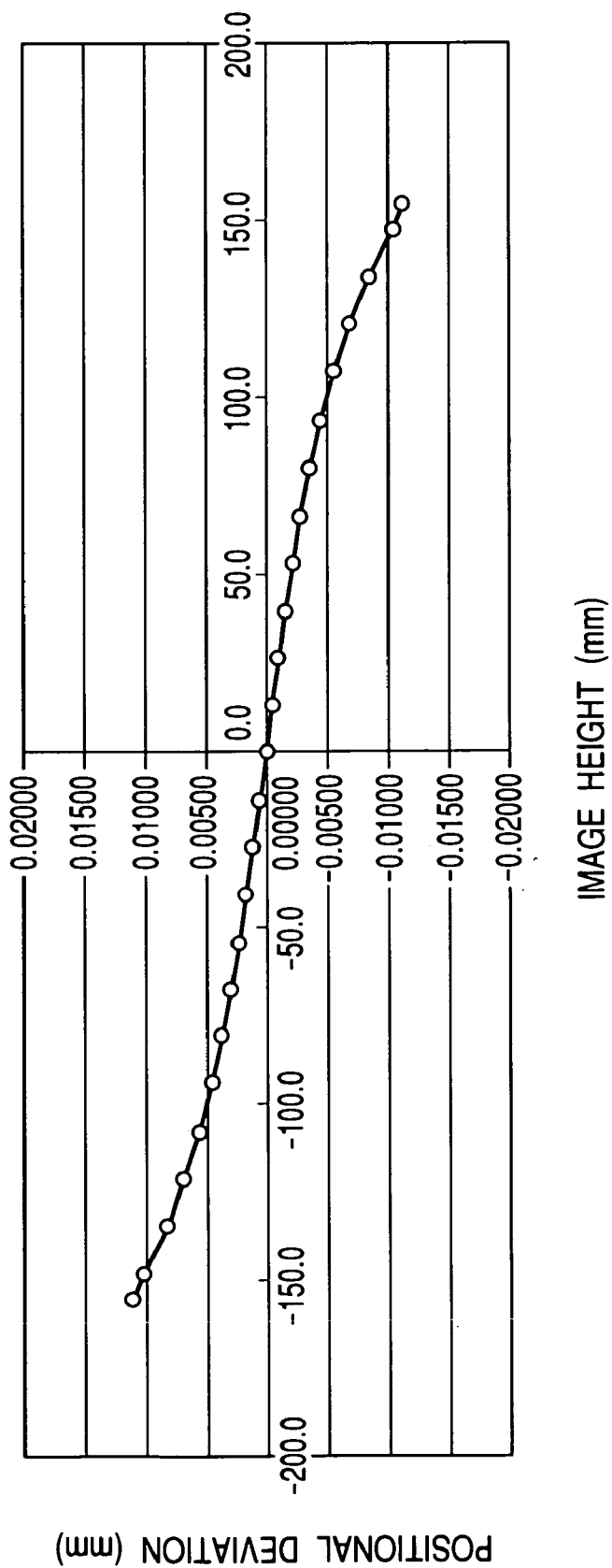
FIG. 17 is a diagram showing a third positional deviation amount in the second embodiment of the present invention.

In addition, FIG. 17 shows the third positional deviation amount δY3 in this embodiment. In the figure, setting of the horizontal axis and the vertical axis is the same as FIG. 14.

In this embodiment, a wavelength of the light beam emitted from the luminescence part D is set to 780 nm which is a reference wavelength, and a wavelength of the light beam emitted from the luminescence part A is set to 785 nm which is 5 nm longer than the reference wavelength.

Figure 18:
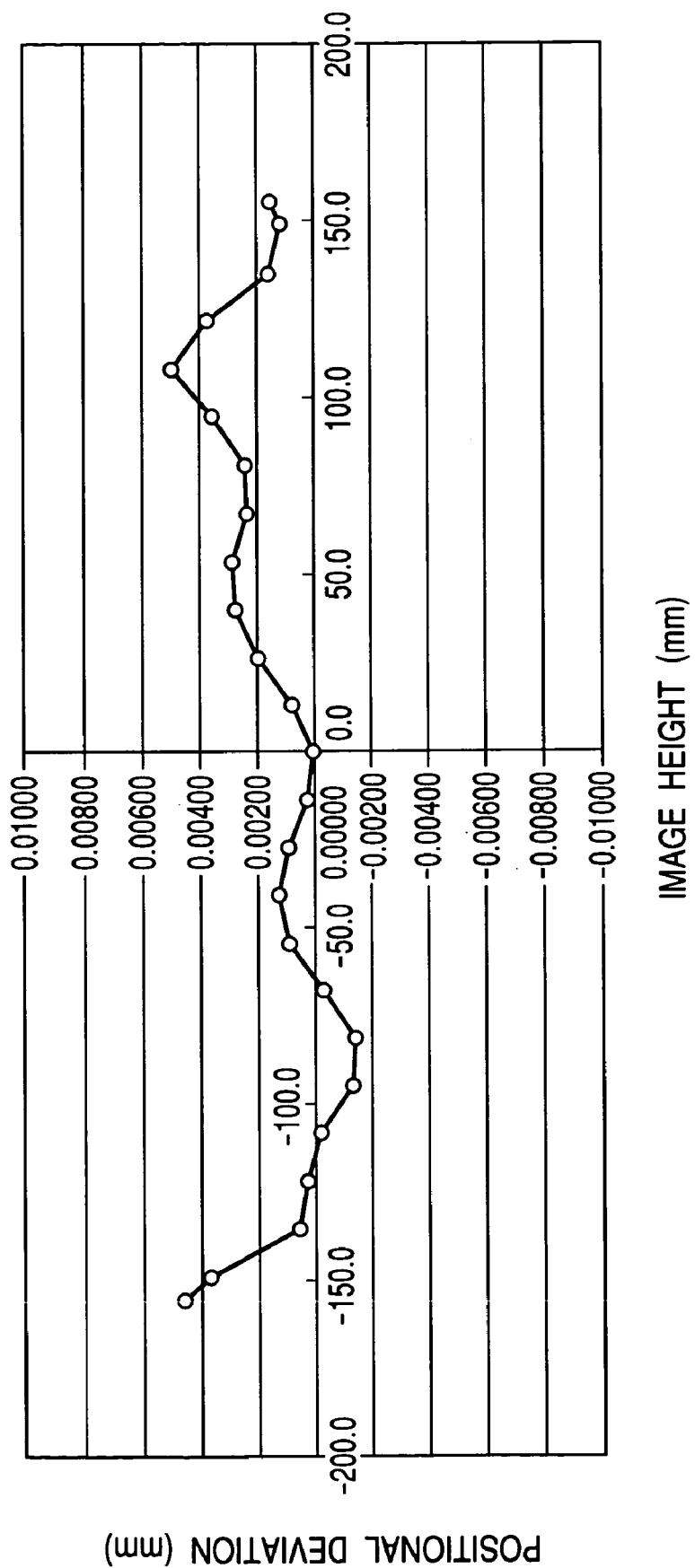
FIG. 18 is a diagram showing a total positional deviation amount after the first positional deviation is corrected by the second positional deviation and the third positional deviation in the second embodiment of the present invention.

A sum of the first, the second, and the third positional deviation amounts δY1, δY2 and δY3 is a total of actually remaining positional deviation amount. The total positional deviation amount is shown in FIG. 18. As it is seen from FIG. 18, the total positional deviation amount can be effectively corrected by the first positional deviation amount δY1 which is generated in the case in which the respective light beams to be made incident on the photosensitive drum surface 7 and the normal line of the photosensitive drum surface 7 are arranged forming the predetermined incident angle β in the sub-scanning direction, the second positional deviation amount δY2 which is generated by making convergent light beams incident on the fθ lens system 6, and the third positional deviation amount δY3 which is generated due to a relative wavelength difference of the respective light beams.

It is seen that, in this embodiment, a final total positional deviation amount is controlled to be smaller than or equal to a largest value of absolute values of the positional deviation amounts δY1, δY2 and δY3, and conditional expression (1) is satisfied. In addition, it is seen that the final total positional deviation amount is controlled to be a small amount of 5 μm (0.005 mm) or less in an entire effective scanning area, and conditional expression (2) is satisfied. Further, it is seen that, since the direction of the first positional deviation and the direction of the second positional deviation and the third positional deviation are opposite, conditional expression (3) is also satisfied.

In addition, in this embodiment, respective parameters are set such that:

the number of luminescence parts N is four;

an average value γ of an angle formed by the principal rays of the four light beams emitted from the condensing lens 2 and the optical axis of the fθ lens system 6 is 70 degrees;

the focal length fcol of the condensing lens 2 is 30.55254 mm;

the interval d of the four luminescence parts A, B, C and D is 0.1 mm;

the average value β of the angle which the principal rays of the four light beams to be made incident on the photosensitive drum surface 7 in the sub-scanning section forms with respect to the normal line of the photosensitive drum surface 7 is 14.1 degrees;

a radius r of a circle inscribed in the polygon mirror is 17.32051 mm;

a maximum scanning angle η of the four light beams deflected and used for scanning by the polygon mirror is 41.75084 degrees;

the angle $\theta_{max}$ formed by the normal line of the photosensitive drum surface 7 in the maximum scanning position of the four light beams, which are used for scanning the photosensitive drum surface 7 by the fθ lens system 6, and the four light beams is 29.306 degrees;

the maximum value δλ of the relative wavelength difference of the four light beams emitted from the four luminescence parts A, B, C and D is 5 nm;

the distance Sd from the light outgoing side principal plane of the fθ lens system 6 to the natural convergent point of the convergent light beams or the divergent light beams converted by the condensing lens 2 is 1034.45644 mm;

the distance Sk from the light outgoing side principal plane of the fθ lens system 6 to the position, in which the convergent light beams or the divergent light beams converted by the condensing lens 2 are converged and focused by the fθ lens system 6, is 202.92744 mm;

the fθ coefficient f of the fθ lens system 6 is 212.71058 mm; and an interval P of focusing points in the sub-scanning direction on the photosensitive drum surface 7 of four light beams determined from a resolution is 0.042333 mm (600 DPI).

Here, the first positional deviation amount δY1, which is a deviation amount between a focusing position of a light beam emitted from the luminescence part A and a focusing position of a light beam emitted from the luminescence part D, generated in the case in which the respective light beams to be made incident on the photosensitive drum surface 7 and the normal line of the photosensitive drum surface 7 are arranged forming the predetermined incident angle β in the sub-scanning direction can be represented by the following expression:

$$\delta Y1 = P(N-1) \times \sin\beta \times \tan\theta_{max} \quad \text{[Expression 6]}$$

On the other hand, the second positional deviation amount δY2 generated by making convergent light beams incident on the fθ lens system 6 becomes maximum in the maximum scanning position on the opposite side of the light source means 1 because, referring to FIGS. 23 and 24, δye in FIG. 24 is larger than δys in FIG. 23.

Here, the second positional deviation amount δY2 can be approximated as represented by the following expression:

[Expression 7]

$$\delta Y2 = \frac{r\tan\frac{\eta}{2}\frac{d(N-1)}{2f_{col}}\left(\cos\left(2\arctan\frac{d(N-1)}{2f_{col}}\right)\right)+}{\sin\left(\frac{y}{2}+\frac{\eta}{2}\right)}\cdot\frac{\cos\gamma\tan\mu}{Sd}\cdot\frac{Sk}{Sd}$$

In addition, the third positional deviation amount δY3 due to a magnification chromatic aberration in the case in which a relative wavelength difference exists in the light beams emitted from the four luminescence parts A, B, C and D is set to a dispersion value of an optical glass or a plastic material for optics constituting the fθ lens system 6. In a range of a dispersion value of a usual optical glass or a plastic material for optics, the third positional deviation amount δY3 can be approximated as follows:

$$\delta Y3 = 9.5\delta\lambda f$$

Here, in this embodiment, as it is seen from FIG. 14 or 15 and FIGS. 16 and 17, the first positional deviation amount δY1 is corrected by the second and the third positional deviation amounts δY2 and δY3 in the opposite direction. A correction residual δall thereof can be represented as follows in an approximated manner using the first, second and third positional deviation amounts δY1, δY2 and δY3:

[Expression 8]

$$\delta all = |\delta Y1 - (\delta Y2 + \delta Y3)|$$
$$= \left| P(N-1)\sin\beta\tan\theta_{max} - \left(\frac{r\tan\frac{\eta}{2}\frac{d(N-1)}{2f_{col}}\left(\cos\left(2\arctan\frac{2(N-1)}{2f_{col}}\right)\right)+}{\sin\left(\frac{y}{2}+\frac{\eta}{2}\right)}\cdot\frac{Sk}{Sd} + 9.5\delta\lambda f\right)\right|$$

In general, a positional deviation of focusing points in the main-scanning direction tends to be visually recognized easily when the positional deviation exceeds 14 μm (0.014 mm), and influence of the positional deviation on an image cannot be neglected. Thus, it is desirable that the following conditional expression is satisfied:

[Expression 9]

$$\delta all = |\delta Y1 - (\delta Y2 + \delta Y3)|$$
$$= \left| P(N-1)\sin\beta\tan\theta_{max} - \left(\frac{r\tan\frac{\eta}{2}\frac{d(N-1)}{2f_{col}}\left(\cos\left(2\arctan\frac{2(N-1)}{2f_{col}}\right)\right)+}{\sin\left(\frac{y}{2}+\frac{\eta}{2}\right)}\cdot\frac{Sk}{Sd} + 9.5\delta\lambda f\right)\right| \leq 0.014 \quad (4)$$

When the respective numerical values in this embodiment are substituted in expression 9, δall is equal to 0.00277. This satisfies conditional expression (4).

As described above, in this embodiment, respective characteristics of an optical system are set so as to satisfy conditional expression (4). This makes it possible to realize a multi-beam optical scanning device which effectively corrects a positional deviation of focusing in the main-scanning direction and is optimal for high-speed and a high image quality.

(Third Embodiment)

Next, a third embodiment of the present invention will be described.

Figure 19:
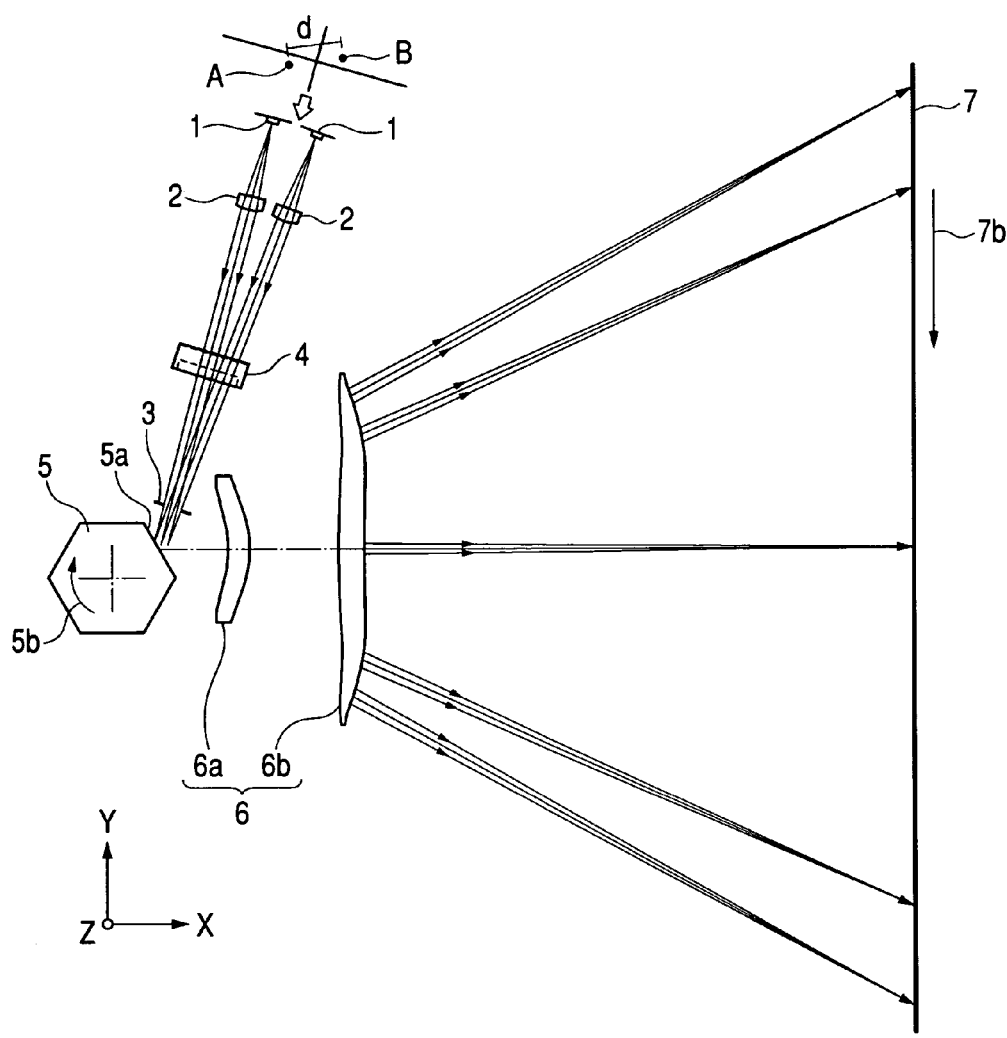
FIG. 19 is a main-scanning sectional view of a multi-beam optical scanning device in a third embodiment of the present invention.
Figure 20:
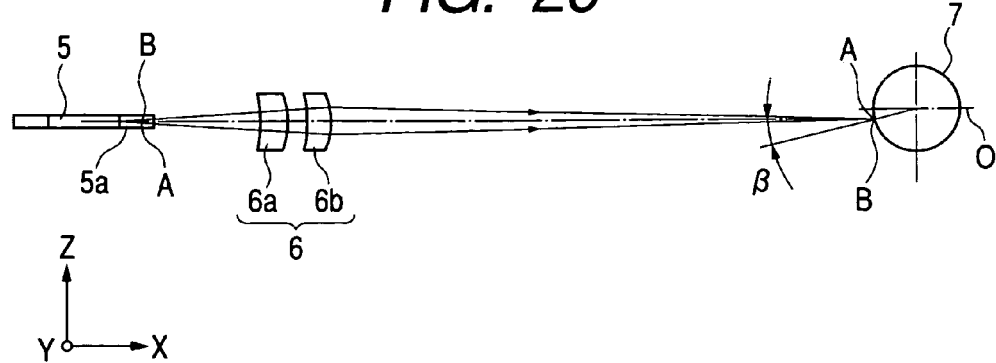
FIG. 20 is a sub-scanning sectional view of the multi-beam optical scanning device in the third embodiment of the present invention.

FIG. 19 is a sectional view of a principal part in a main-scanning direction (main-scanning sectional view) of the third embodiment of the present invention. FIG. 20 is a sectional view of a principal part in a sub-scanning direction (sub-scanning sectional view) of FIG. 19. In FIGS. 19 and 20, elements identical with those shown in FIGS. 1 and 2 are denoted by the same reference numerals and signs.

This embodiment is different from the first embodiment in that there are two light sources 1 which have luminescence parts A and B, respectively, and there are two condensing lenses 2 corresponding to the respective light sources 1. The other parts of the structure and optical actions are substantially the same as those in the first embodiment, whereby the same effects are obtained.

Here, the maximum value α of the relative angle difference in the main-scanning section of the principal rays of the two light beams to be made incident on the polygon mirror 5 is set to 4 degrees. In addition, a convergent light beam, which is condensed in a position 3316.80933 mm from the light outgoing side principal plane of the fθ lens system 6, is made incident on the fθ lens system 6. The light beam is focused in a position 201.05427 mm from the light outgoing side principal plane of the fθ lens system 6 by the fθ lens system 6. The degree of non-parallelism K is set as K=Sk/Sd=0.06062. In addition, the relative wavelength difference of the light beams emitted from the two luminescence parts A and B is set to zero, and the other characteristics are set in the same manner as the second embodiment.

Referring to FIGS. 23 and 24, it can be understood easily that the amounts of δys and δye increase as an angle formed by the light beam from the luminescence part A and the light beam from the luminescence part B increases. In other words, it is seen that the second positional deviation amount δY2, which is generated by making convergent light beams incident on the fθ lens system 6, is increased as the maximum value α of the relative angle difference in the main-scanning section of the principal rays of the two light beams to be made incident on the polygon mirror 5 is increased.

If this principle is utilized, the first positional deviation amount δY1, which a deviation amount of the focusing position of the light beam emitted from the luminescence part A and the focusing position of light beam emitted from the luminescence part B, generated in the case in which the respective light beams to be made incident on the photosensitive drum surface 7 and the normal line of the photosensitive drum surface 7 are arranged forming the predetermined incident angle β in the sub-scanning direction can be corrected only by the second positional deviation amount δY2 without using the third positional deviation amount δY3 due to the relative wavelength difference of the two luminescence parts A and B.

In this embodiment, there is a characteristic in that, by setting the angle α to as large as 4 degrees, the first positional deviation amount δY1, which a deviation amount of the focusing position of the light beam emitted from the luminescence part A and the focusing position of light beam emitted from the luminescence part B, generated in the case in which the respective light beams to be made incident on the photosensitive drum surface 7 and the normal line of the photosensitive drum surface 7 are arranged forming the predetermined incident angle β in the sub-scanning direction is corrected only by the second positional deviation amount δY2 generated by making convergent light beams incident on the fθ lens system 6.

Here, the first positional deviation amount δY1 can be calculated by the following expression described in the second embodiment:

$$\delta Y1 = P(N-1) \times \sin\beta \times \tan\theta_{max} \quad \text{[Expression 10]}$$

On the other hand, the second positional deviation amount δY2 can be approximated as follows:

[Expression 11]

$$\delta Y2 = \frac{r\tan\frac{\eta}{2}\tan\frac{\alpha}{2}(\cos\alpha + \cos\gamma\tan\eta)}{\sin\left(\frac{y}{2} + \frac{\eta}{2}\right)} \frac{Sk}{Sd}$$

In this embodiment, since the first positional deviation amount δY1 is corrected only by the second positional deviation amount δY2, the correction residual δall thereof can be represented as follows in an approximated manner using the first and second positional deviation amounts δY1 and δY2:

[Expression 12]

$$\delta all = |\delta Y1 - \delta Y2|$$
$$= \left| P(N-1)\sin\beta\tan\theta_{max} - \frac{r\tan\frac{\eta}{2}\tan\frac{\alpha}{2}(\cos\alpha + \cos\gamma\tan\eta)}{\sin\left(\frac{y}{2} + \frac{\eta}{2}\right)} \frac{Sk}{Sd} \right|$$

In general, a positional deviation of focusing points in the main-scanning direction tends to be visually recognized easily when the positional deviation exceeds 14 μm (0.014 mm), and influence of the positional deviation on an image cannot be neglected. Thus, it is desirable that the following conditional expression is satisfied:

[Expression 13] (5)

$$\delta all = |\delta Y1 - \delta Y2|$$
$$= \left| P(N-1)\sin\beta\tan\theta_{max} - \frac{r\tan\frac{\eta}{2}\tan\frac{\alpha}{2}(\cos\alpha + \cos\gamma\tan\eta)}{\sin\left(\frac{y}{2} + \frac{\eta}{2}\right)} \frac{Sk}{Sd} \right| \leq 0.014$$

When the respective numerical values in this embodiment are substituted in expression 13, δall is equal to 0.00464. This satisfies conditional expression (5).

As described above, in this embodiment, respective characteristics of an optical system are set so as to satisfy conditional expression (5). This makes it possible to realize a multi-beam optical scanning device which effectively corrects a positional deviation of focusing in the main-scanning direction and is optimal for high-speed and a high image quality.

Here, in this embodiment, the first positional deviation amount δY1, which a deviation amount of the focusing position of the light beam emitted from the luminescence part A and the focusing position of light beam emitted from the luminescence part B, generated in the case in which the respective light beams to be made incident on the photosensitive drum surface 7 and the normal line of the photosensitive drum surface 7 are arranged forming the predetermined incident angle β in the sub-scanning direction is corrected only by the second positional deviation amount δY2 without using the third positional deviation amount δY3 due to the relative wavelength difference of the two luminescence parts A and B. However, it goes without saying that, even if the third positional deviation amount δY3 due to the relative wavelength difference of the two luminescence parts A and B is used for the correction, this does not mean departure from the spirit of the present invention.

In that case, instead of the conditional expression (5), the following conditional expression only has to be satisfied:

[Expression 14] (6)

$$\delta all = \delta Y1 - (\delta Y2 + \delta Y3)$$
$$= \left| P(N-1)\sin\beta\tan\theta_{max} - \left( \frac{r\tan\frac{\eta}{2}\tan\frac{\alpha}{2}(\cos\alpha + \cos\gamma\tan\eta)}{\sin\left(\frac{\gamma}{2} + \frac{\eta}{2}\right)} \frac{Sk}{Sd} + 9.5\delta\lambda f \right) \right| \leq 0.014$$

As described above, in this embodiment, respective characteristics of an optical system are set so as to satisfy conditional expressions (5) and (6). This makes it possible to realize a multi-beam optical scanning device which effectively corrects a positional deviation of focusing in the main-scanning direction and is high-speed and optimal for a high image quality.

Note that, although the descriptions have been made assuming that the light beams emitted from the condensing lens 2 are convergent light beams in the respective embodiments of the present invention, it is needless to mention that the same correction is possible even if the light beams are assumed to be divergent light beams. In that case, it could be easily understood that the same correction is possible by reversing the vertical positions in the sub-scanning direction of the two luminescence parts A and B.

The fθ lens system 6 in the first to the third embodiments is constituted by the two lenses 6a and 6b. However, the present invention is not limited to a two lens system, and the fθ lens system 6 may be constituted by one lens or three or more lenses.

In addition, an optical element constituting the fθ lens system 6 (third optical system) is not limited to a lens. A power mirror (curved surface mirror) or a diffractive optical element may be included in the fθ lens system 6 (third optical system).

Further, as the light source means having at least two luminescence parts used in the present invention, a monolithic multi-beam laser is used. As the monolithic multi-beam laser, both an edge-emitting laser and a surface emitting laser are used.

Moreover, light source means of a beam composition system such as a polarizing beam splitter, in which at least two monolithic single semiconductor lasers are combined, can also be applied to the present invention.

Image Forming Apparatus

Figure 21:
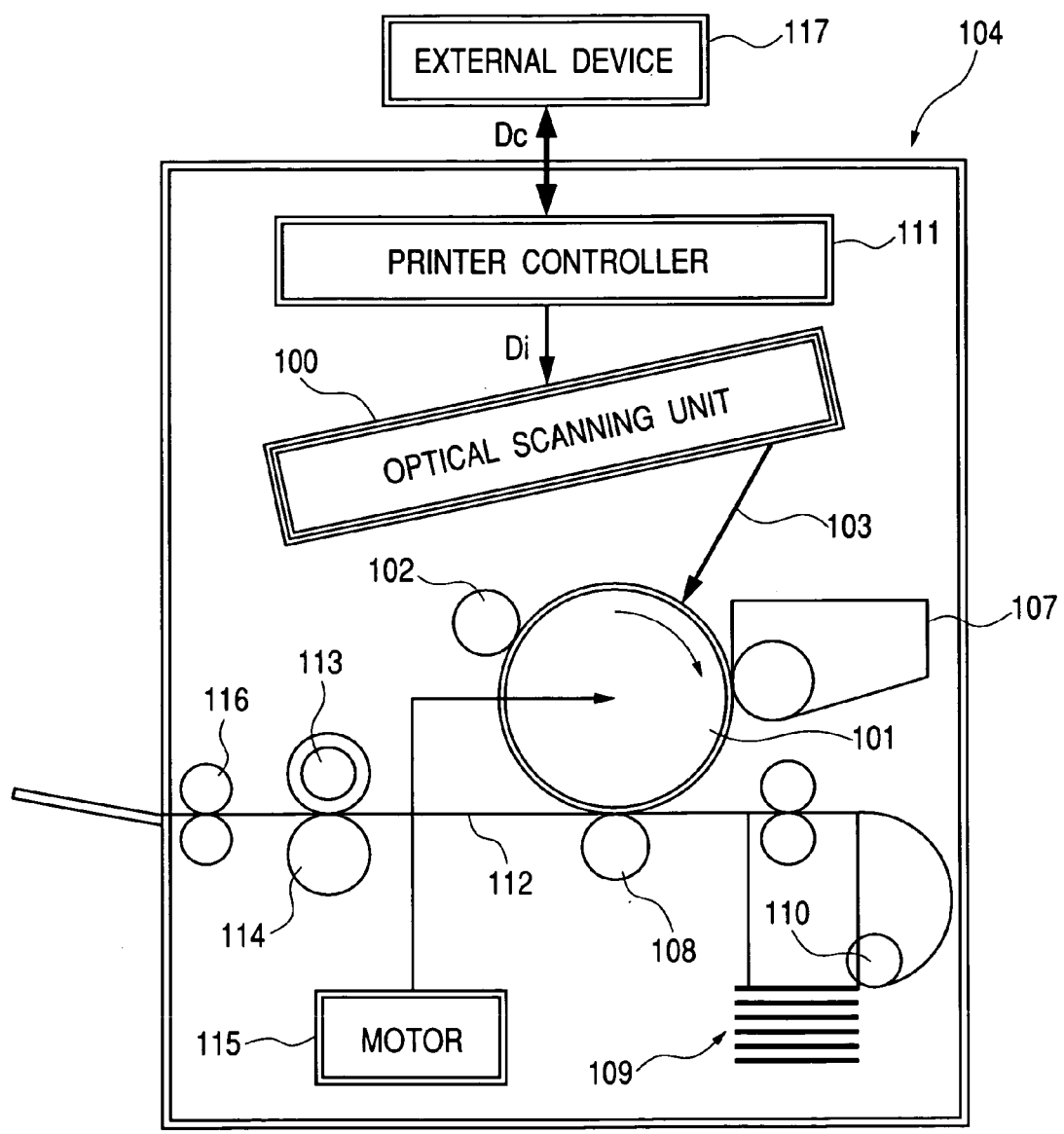
FIG. 21 is a sub-scanning sectional view showing an embodiment of an image forming apparatus of the present invention.

FIG. 21 is a sectional view of a principal part in a sub-scanning direction showing an embodiment of an image forming apparatus of the present invention. In the figure, reference numeral 104 denotes an image forming apparatus. Code data Dc is inputted to this image forming apparatus 104 from an external device 117 such as a personal computer. This code data Dc is converted into image data (dot data) Di by a printer controller 111 in the image forming apparatus 104. This image data Di is inputted to an optical scanning unit (multi-beam optical scanning device) 100 having the structure described in the first to the fourth embodiments. Then, a light beam 103, which is modulated according to the image data Di, is emitted from this optical scanning unit 100, and a photosensitive surface of the photosensitive drum 101 is scanned in the main-scanning direction by-this light beam 103.

The photosensitive drum 101 serving as an electrostatic latent image bearing member (photosensitive member) is rotated clockwise by a motor 115. Then, in accordance with this rotation, the photosensitive surface of the photosensitive drum 101 moves in a sub-scanning direction perpendicular to the main-scanning direction with respect to the light beam 103. A charging roller 102 for charging the surface of the photosensitive drum 101 uniformly is provided above the photosensitive drum 101 so as to come into abutment against the surface. Further, the light beam 103, which is used for scanning by the optical scanning unit 100, is irradiated on the surface of the photosensitive drum 101 which is charged by the charging roller 102.

As described before, the light beam 103 is modulated on the basis of the image data Di. An electrostatic latent image is formed on the surface of the photosensitive drum 101 by irradiating the light beam 103. This electrostatic latent image is developed as a toner image by a developing device 107 which is disposed so as to come into abutment against the photosensitive drum 101 further on a downstream side in a rotating direction of the photosensitive drum 101 than an irradiation position of the light beam 103.

The toner image developed by the developing device 107 is transferred onto a sheet 112, which serves as a material to have an image transferred thereon, by a transfer roller 108, which is disposed so as to be opposed to the photosensitive drum 101, below the photosensitive drum 101. Although the sheet 112 is stored in a sheet cassette 109 in front of the photosensitive drum 101 (right side in FIG. 21), the sheet 112 can also be fed manually. A sheet feeding roller 110 is disposed at an end of the sheet cassette 109 and feeds the sheet 112 in the sheet cassette 109 to a conveyance path.

The sheet 112 having an unfixed toner image transferred thereon is further conveyed to a fixing device behind the photosensitive drum 101 (left side in FIG. 21) as described above. The fixing device is constituted by a fixing roller 113 having a fixing heater in the inside thereof and a pressure roller 114, which is disposed so as to come into pressed contact with the fixing roller 113. The fixing device fixes the unfixed toner image on the sheet 112 by heating the sheet 112 transferred from a transfer section while pressuring the sheet 112 with a press contact section of the fixing roller 113 and the pressure roller 114. Moreover, a sheet discharge roller 116 is disposed behind the fixing roller 113 and discharges the sheet 112 having the toner image fixed thereon to the outside of the image forming apparatus.

Although not illustrated in FIG. 21, the printer controller 111 performs not only the conversion of data described above but also control of the respective sections in the image forming apparatus such as the motor 115, a polygon motor in an optical scanning unit to be described later, and the like.

Color Image Forming Apparatus

Figure 32:
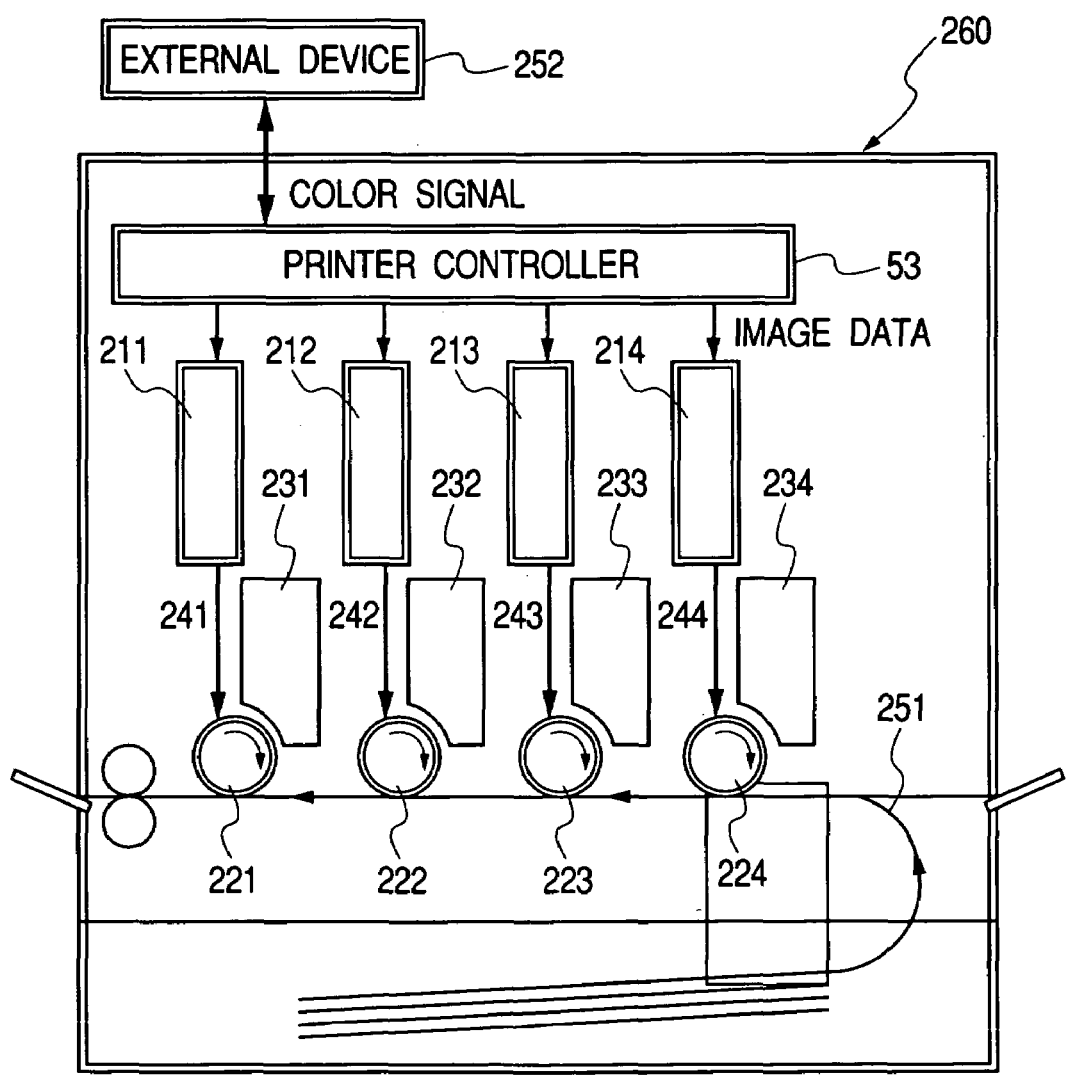
FIG. 32 is a schematic diagram of a principal part of a color image forming apparatus of an aspect of the present invention.

FIG. 32 is a schematic diagram of a principal part of a color image forming apparatus of an aspect of the present invention. This embodiment is a color image forming apparatus of a tandem type in which four optical scanning devices are arranged to record image information on a photosensitive drum serving as an image bearing member in parallel with each other. In FIG. 32, reference numeral 260 denotes a color image forming apparatus; 211, 212, 213 and 214, optical scanning devices (multi-beam optical scanning devices) having any one of the structures described in the first to the third embodiments; 221, 222, 223 and 224, photosensitive drums serving as image bearing members; 231, 232, 233 and 234, developing devices; and 251, a conveyor belt.

In FIG. 32, color signals of R (red), G (green) and B (blue) are inputted to the color image forming apparatus 260 from an external device 252 such as a personal computer. These color signals are converted into image data (dot data) of C (cyan), M (magenta), Y (yellow) and B (black) by a printer controller 253 in the color image forming apparatus 260. These image data are inputted to the optical scanning devices 211, 212, 213 and 214, respectively. Light beams (multi-beam lasers) 241, 242, 243 and 244, which are modulated according to the respective image data, are emitted from these optical scanning devices 211, 212, 213 and 214. Photosensitive surfaces of the photosensitive drums 221, 222, 223 and 224 are scanned in a main-scanning direction by these light beams.

In the color image forming apparatus of this aspect of the present invention, the four optical scanning devices (211, 212, 213 and 214) are arranged, correspond to the colors of C (cyan), M (magenta), Y (yellow) and B (black), respectively, and record image signals (image information) on the surfaces of the photosensitive drums 221, 222, 223 and 224 in parallel with each other to print a color image at high speed.

The color image forming apparatus in this aspect of the present invention forms latent images of the respective colors on the surfaces of the corresponding photosensitive drums 221, 222, 223 and 224 using light beams based upon the respective image data with the four optical scanning devices 211, 212, 213 and 214 as described above. Thereafter, the latent images are multiply transferred onto a recording medium to form one full-color image.

As the external device 252, for example, a color image reading apparatus including a CCD sensor may be used. In this case, this color image reading apparatus and the color image forming apparatus 260 constitute a color digital copying machine.

The various examples and embodiments of the present invention have been described. Those skilled in the art would appreciate that the spirit and the scope of the present invention are not limited to the specific descriptions and drawings in this specification but cover various modifications and alterations described in claims.

According to the present invention, by setting the respective elements optimally so as to satisfy respective conditional expressions as described above, a deviation of focusing positions in a main-scanning direction of plural spots in an entire surface to be scanned is almost completely offset and corrected without deteriorating focusing properties at all. Consequently, a multi-beam optical scanning apparatus suitable for high speed and high recording density can be attained.

What is claimed is:

1. A multi-beam optical scanning device comprising:
light source means which has plural luminescence parts arranged apart from each other in both a main-scanning direction and a sub-scanning direction;
a rotating polygon mirror which has reflection surfaces for deflecting plural light beams emitted from the plural luminescence parts, respectively;
a converting optical system which is arranged in an optical path leading from the light source means to the rotating polygon mirror and converts the plural light beams into convergent light beams or divergent light beams; and
a focusing optical system which focuses the plural light beams deflected by the rotating polygon mirror onto a surface to be scanned of a drum shape having a rotation axis along the main-scanning direction,
wherein, in a sub-scanning section, the respective light beams to be made incident on the surface to be scanned are made incident such that principal rays thereof form an angle with respect to a normal line of the surface to be scanned, respectively, whereby when it is assumed that a positional deviation is caused in a first direction relatively parallel to the main-scanning direction between focusing points of the respective light beams on the surface to be scanned, a positional deviation is caused in a second direction relatively parallel to the main-scanning direction between the focusing points of the respective light beams on the surface to be scanned as convergent light beams or divergent light beams are made incident on the focusing optical system in a main scanning section, and, when the light beams emitted from the plural luminescence parts have a relative wavelength difference, a positional deviation is caused in a third direction relatively parallel to the main-scanning direction between the focusing points of the respective light beams on the surface to be scanned due to the relative wavelength difference, and
a number of the plural luminescence parts is N,
in the main scanning section, an average value of an angle formed by the principal rays of the plural light beams emitted from the first optical system and the optical axis of the focusing optical system is $\gamma$,
a focal length of the converting optical system in the main scanning section is $f_{col}$,
an interval of the plural luminescence parts is d,
an average value of the angle which the principal rays of the plural light beans to be made incident on the surface to be scanned in the sub-scanning section forms with respect to the normal line of the surface to be scanned is $\beta$,
a radius of a circle inscribed in the rotating polygon minor is r,
a maximum scanning angle of the plural light beams deflected by the rotating polygon minor is $\eta$,
a maximum value of the angle formed by the normal line of the surface to be scanned in the maximum scanning position of the plural light beams, which are used for scanning the surface to be scanned by the focusing optical system, and the plural light beams is $\theta_{max}$,
a maximum value of the relative wavelength difference of the plural light beams emitted from the plural luminescence parts is $\delta\lambda$,
a distance from a light outgoing side principal plane of the focusing optical system to a natural convergent point of the convergent light beams or the divergent light beams convened by the converting optical system is Sd,
a distance from the light outgoing side principal plane of the focusing optical system to a position, in which the convergent light beams or the divergent light beams converted by the converting optical system are focused by the focusing optical system, is Sk;
an f$\theta$ coefficient of the focusing optical system is f, and
an interval of focusing points in the sub-scanning direction on the surface to be scanned of the plural light beams determined from a resolution is P,
the following conditional expression is satisfied:

$$\left| P(N-1)\sin\beta\tan\theta_{max} - \left( \frac{r\tan\frac{\eta}{2}\frac{d(N-1)}{2f_{col}}\left(\cos\left(2\arctan\frac{d(N-1)}{2f_{col}}\right)+\cos\gamma\tan\eta\right)}{\sin\left(\frac{\gamma}{2}+\frac{\eta}{2}\right)}\frac{Sk}{Sd} + 9.5\,\delta\lambda f \right) \right| \leq 0.014.$$

2. An image forming apparatus comprising:
the multi-beam optical scanning device according to claim 1;
a photosensitive member arranged on the surface to be scanned;
a developing device which develops an electrostatic latent image, which is formed on the photosensitive member by a light beam used for scanning in the multi-beam optical scanning device, as a toner image;
a transfer device which transfers the developed toner image onto a material to have an image transferred thereon; and
a fixing device which fixes the transferred toner image to the material to have an image transferred thereon.

3. An image forming apparatus comprising:

the multi-beam optical scanning device according to claim 1; and a printer controller which converts code data inputted from an external device into an image signal and inputs the image signal to the multi-beam optical scanning device.

4. A color image forming apparatus comprising plural image bearing members which are arranged on the surfaces to be scanned of the multi-beam optical scanning device according to claim 1, and form images of colors different from each other.

5. The color image forming apparatus according to claim 4, further comprising a printer controller which converts color signals inputted from an external device into image data of different colors and inputs the image data to the respective multi-beam optical scanning devices.

* * * * *

UNITED STATES PATENT AND TRADEMARK OFFICE
CERTIFICATE OF CORRECTION

PATENT NO. : 7,145,591 B2 Page 1of 2
APPLICATION NO. : 10/802856
DATED : December 5, 2006
INVENTOR(S) : Yoshihiro Ishibe It is certified that error appears in the above-identified patent and that said Letters Patent is hereby corrected as shown below:

COLUMN 3
    Line 56, "polygon;" should read --polygon mirror;--; and
    Line 60, "polygon;" should read --polygon mirror;--.

COLUMN 7
    Line 22, "titled" should read --tilted--.

COLUMN 19
    Expression 7 should read $$\frac{r\tan\frac{\eta}{2}\frac{d(N-1)}{2f_{col}}\left(\cos\left(2\arctan\frac{d(N-1)}{2f_{col}}\right)\right)+\cos\gamma\tan\mu}{\sin\left(\frac{\gamma}{2}+\frac{\eta}{2}\right)}\frac{Sk}{Sd}$$

--                                                           --;

Expression 8 should read $$\delta all = |\delta Y1 - (\delta Y2 + \delta Y3)|$$

$$= \left|P(N-1)\sin\beta\tan\theta_{max} - \left(\frac{r\tan\frac{\eta}{2}\frac{d(N-1)}{2f_{col}}\left(\cos\left(2\arctan\frac{d(N-1)}{2f_{col}}\right)+\cos\gamma\tan\eta\right)}{\sin\left(\frac{\gamma}{2}+\frac{\eta}{2}\right)}\frac{Sk}{Sd}+9.5\delta\lambda f\right)\right|$$

--                                                           --;

and

Expression 9 should read $$\delta all = |\delta Y1 - (\delta Y2 + \delta Y3)|$$

$$= \left|P(N-1)\sin\beta\tan\theta_{max} - \left(\frac{r\tan\frac{\eta}{2}\frac{d(N-1)}{2f_{col}}\left(\cos\left(2\arctan\frac{d(N-1)}{2f_{col}}\right)+\cos\gamma\tan\eta\right)}{\sin\left(\frac{\gamma}{2}+\frac{\eta}{2}\right)}\frac{Sk}{Sd}+9.5\delta\lambda f\right)\right| \leq 0.014$$

--                                                           --.

CERTIFICATE OF CORRECTION (continued)
U.S. Pat. No. 7,145,591 B2

COLUMN 21
Expression 11 should read $$\delta Y2 = \frac{r \tan\frac{\eta}{2} \tan\frac{\alpha}{2}(\cos\alpha + \cos\gamma \tan\eta)}{\sin\left(\frac{\gamma}{2} + \frac{\eta}{2}\right)} \frac{Sk}{Sd}$$

--; and

Expression 12 should read $$\delta all = |\delta Y1 - \delta Y2|$$
$$= \left| P(N-1)\sin\beta \tan\theta_{max} - \frac{r \tan\frac{\eta}{2} \tan\frac{\alpha}{2}(\cos\alpha + \cos\gamma \tan\eta)}{\sin\left(\frac{\gamma}{2} + \frac{\eta}{2}\right)} \frac{Sk}{Sd} \right|$$

--.

COLUMN 22
Expression 13 should read $$\delta all = |\delta Y1 - \delta Y2|$$
$$= \left| P(N-1)\sin\beta \tan\theta_{max} - \frac{r \tan\frac{\eta}{2} \tan\frac{\alpha}{2}(\cos\alpha + \cos\gamma \tan\eta)}{\sin\left(\frac{\gamma}{2} + \frac{\eta}{2}\right)} \frac{Sk}{Sd} \right| \leq 0/014$$

--.

COLUMN 23
Line 38, "by-this" should read --by this--.

COLUMN 24
Line 21, "polygon motor" should read --polygon mirror--.

COLUMN 26
Line 2, "beans" should read --beams--;
Line 10, "minor" should read --mirror--; and
Line 23, "convened" should read --converted--.

Signed and Sealed this

Sixteenth Day of February, 2010

David J. Kappos
*Director of the United States Patent and Trademark Office*